United States Patent
McKenney

(10) Patent No.: US 8,869,166 B2
(45) Date of Patent: *Oct. 21, 2014

(54) EFFECTIVE MANAGEMENT OF BLOCKED-TASKS IN PREEMPTIBLE READ-COPY UPDATE

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 312 days.

This patent is subject to a terminal disclaimer.

(21) Appl. No.: 13/437,215

(22) Filed: Apr. 2, 2012

(65) Prior Publication Data

US 2012/0324461 A1 Dec. 20, 2012

Related U.S. Application Data

(63) Continuation of application No. 13/164,265, filed on Jun. 20, 2011, now Pat. No. 8,615,771.

(51) Int. Cl.
*G06F 9/46* (2006.01)
*G06F 13/00* (2006.01)
*G06F 7/00* (2006.01)

(52) U.S. Cl.
USPC ............ 718/107; 718/108; 711/154; 707/704

(58) Field of Classification Search
None
See application file for complete search history.

(56) References Cited

U.S. PATENT DOCUMENTS

| | | | |
|---|---|---|---|
| 5,442,758 | A | 8/1995 | Slingwine et al. |
| 5,608,893 | A | 3/1997 | Slingwine et al. |
| 5,727,209 | A | 3/1998 | Slingwine et al. |
| 6,219,690 | B1 | 4/2001 | Slingwine et al. |
| 6,662,184 | B1 | 12/2003 | Friedberg |
| 6,886,162 | B1 | 4/2005 | McKenney |
| 6,996,812 | B2 | 2/2006 | McKenney |
| 7,191,272 | B2 | 3/2007 | McKenney |
| 7,287,135 | B2 | 10/2007 | McKenney et al. |
| 7,349,926 | B2 | 3/2008 | McKenney et al. |

(Continued)

FOREIGN PATENT DOCUMENTS

| | | |
|---|---|---|
| JP | 20044326783 | 9/2002 |
| WO | WO02073417 | 9/2002 |

OTHER PUBLICATIONS

McKenney, Paul et al. "RCU Semantics: A First Attempt". Jan. 30, 2005.*

(Continued)

*Primary Examiner* — Adam Lee
(74) *Attorney, Agent, or Firm* — Walter W. Duft

(57) ABSTRACT

A technique for managing read-copy update readers that have been preempted while executing in a read-copy update read-side critical section. A single blocked-tasks list is used to track preempted reader tasks that are blocking an asynchronous grace period, preempted reader tasks that are blocking an expedited grace period, and preempted reader tasks that require priority boosting. In example embodiments, a first pointer may be used to segregate the blocked-tasks list into preempted reader tasks that are and are not blocking a current asynchronous grace period. A second pointer may be used to segregate the blocked-tasks list into preempted reader tasks that are and are not blocking an expedited grace period. A third pointer may be used to segregate the blocked-tasks list into preempted reader tasks that do and do not require priority boosting.

11 Claims, 32 Drawing Sheets

(56) References Cited

U.S. PATENT DOCUMENTS

| | | | |
|---|---|---|---|
| 7,353,346 | B2 | 4/2008 | McKenney et al. |
| 7,395,263 | B2 | 7/2008 | McKenney |
| 7,395,383 | B2 | 7/2008 | McKenney |
| 7,426,511 | B2 | 9/2008 | McKenney |
| 7,454,581 | B2 | 11/2008 | McKenney et al. |
| 7,472,228 | B2 | 12/2008 | McKenney et al. |
| 7,653,791 | B2 | 1/2010 | McKenney |
| 7,689,789 | B2 | 3/2010 | McKenney et al. |
| 7,734,879 | B2 | 6/2010 | McKenney et al. |
| 7,734,881 | B2 | 6/2010 | McKenney et al. |
| 7,747,805 | B2 | 6/2010 | McKenney |
| 7,814,082 | B2 | 10/2010 | McKenney |
| 7,818,306 | B2 | 10/2010 | McKenney et al. |
| 7,873,612 | B2 | 1/2011 | McKenney et al. |
| 7,904,436 | B2 | 3/2011 | McKenney |
| 7,934,062 | B2 | 4/2011 | McKenney et al. |
| 7,953,708 | B2 | 5/2011 | McKenney et al. |
| 7,953,778 | B2 | 5/2011 | McKenney et al. |
| 2004/0054861 | A1 | 3/2004 | Harres |
| 2006/0112121 | A1 | 5/2006 | McKenney et al. |
| 2006/0117072 | A1 | 6/2006 | McKenney |
| 2006/0130061 | A1 | 6/2006 | McKenney |
| 2006/0265373 | A1 | 11/2006 | McKenney et al. |
| 2007/0067770 | A1 | 3/2007 | Thomasson |
| 2007/0198520 | A1 | 8/2007 | McKenney et al. |
| 2008/0082532 | A1 | 4/2008 | McKenney |
| 2008/0140951 | A1 | 6/2008 | McKenney et al. |
| 2008/0313238 | A1 | 12/2008 | McKenney et al. |
| 2009/0006403 | A1 | 1/2009 | McKenney |
| 2009/0077080 | A1 | 3/2009 | McKenney |
| 2009/0254764 | A1 | 10/2009 | McKenney et al. |
| 2010/0023946 | A1 | 1/2010 | McKenney |
| 2011/0055183 | A1 | 3/2011 | McKenney |

OTHER PUBLICATIONS

P. Zijlstra, "[PATCH] slab: document SLAB_DESTROY_BY_RCU", LKML.org, Nov. 13, 2008, 1 page.
A. Arcangeli et al., "Using Read-Copy-Update Techniques for System V IPC in the Linux 2.5 Kernel," 2003 FREENIX, Jun. 14, 2003, 13 pages.
S. Rostedt, "RCU Preemption Priority Boosting", LKML.org, Oct. 3, 2011, 13 pages.
I. Molnar et al., "linux/kernel/rcutree.h", Jan. 1, 2008, 6 pages.
J. Seigh, "RCU + SMR for preemptive kernel/user threads," Linux Kernel Mailing List, May 9, 2005, 2 pages.
M. Michael, "Hazard Pointers: Safe Memory Reclamation for Lock-Free Objects," IEEE Transactions on Parallel and Distributed Systems, Jun. 2004, vol. 15, No. 6, pp. 491-504.
D. Sarma et al., "Making RCU Safe for Deep Sub-Millisecond Response Realtime Applications," 2004 USENIX (UseLinux track) Jun. 2004, 9 pages.
P. McKenney, "RCU vs. Locking Performance on Different CPUs," 2004 Linux.conf.au, 2004, 18 pages.
P. McKenney et al., "Scaling dcache with RCU," Linux Journal, Jan. 1, 2004, 12 pages.
P. McKenney et al., "Using RCU in the Linux 2.5 Kernel," LInux Journal, Oct. 1, 2003, 11 pages.
P. McKenney et al.,"Read-Copy Update," 2002 Ottawa Linux Symposium, Jul. 8, 2002, 28 pages.
H. Lindar et al., "Scalability of the Directory Entry Cache," 2002 Ottawa Linux Symposium, Jun. 26, 2002, pp. 289-300.
P. McKenney et al., "Read-Copy Update," 2001 Ottawa Linux symposium, Jul. 2001, 22 pages.
P. McKenney et al., "Read-Copy Update: Using Execution History to Solve Concurrency Problems," PDCS, Oct. 1998, 11 pages.
S. Dietrich et al., "Evolution of Real-Time Linux," 7th RTL Workshop, Nov. 17, 2005, 18 pages.
B. Gamsa, "Tornado: Maximizing Locality and Concurrency in a Shared Memory Multiprocessor Operating System," 1999, 14 pages.
Molnar et al., "Realtime and Linux," 2005 Linux Kernel Summit, 8 pages.
H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.
M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.
D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.
J. Corbet, "Read-copy-update for realtime," LWN.net, Sep. 26, 2006, 3 pages.
McKenney, "Seven real-time Linux approaches (Part C)", LinuxDevices.com, Jun. 7, 2005, 13 pages.
P. McKenney, " RCU and CONFIG_PREEMPT_RT progress," Linux Kernel Mailing List, May 9, 2005, 2 pages.
O. Nesterov, QRCU: 'Quick' SRCU Implementation, Linux Kernel Mailing List, Dec. 1, 2005, 3 pages.
P. McKenney, "Sleepable RCU", LWN.net, Oct. 9, 2006, 10 pages.
P. McKenney, "Read-Copy Update Implementations", 2001, 3 pages.
M. Herlihy, "A Methodology for Implementing Highly Concurrent Data Objects," ACM Transactions on Programming Languages and Systems, vol. 15, Issue 5, Nov. 1993, pp. 745-770.
M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.
N. Barghouti et al., "Concurrency Control in Advanced Database Operations," Jan. 1994, 83 pages.
P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.
P. McKenney et al., "Extending RCU for Realtime and Embedded Workloads," 2006 Ottawa Linux Symposium, Aug. 11, 2006, 15 pages.
P. McKenney, "The design of preemptible read-copy-update," LWN.net, Oct. 8, 2007, 27 pages.
P. McKenney, "Integrating and Validating dynticks and Preemptible RCU," LWN.net, Apr. 22, 2008, 19 pages.
P. McKenney, "Hierarchical RCU," LWN.net, Nov. 4, 2008, 19 pages.
P. McKenney, "Is Parallel Programming Hard, and, If So, What Can You Do About It", Mar. 8, 2009, 146 pages.
P. McKenney, "Priority-Boosting RCU Read-Side Critical Sections," LWN.net, Feb. 5, 2007, 15 pages.
P. McKenney et al., "Towards hard realtime response from the Linux kernel on SMP hardware," linux.conf.au, Canberra, Australia, Apr. 2005, 16 pages.
P. McKenney et al., "Exploiting Deferred Destruction: An Analysis of Read-Copy-Update Techniques in Operating System Kernels", Jan. 3, 2005, pp. 1-41.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Simplicity Through Optimization", linux.conf.au, Jan. 2010, 109 pages.
P. McKenney, "Deterministic Synchronization in Multicore Systems: the Role of RCU", Aug. 18, 2009, pp. 1-9.
P. McKenney, "RCU cleanups and simplified preemptable RCU", LKML.org, Jul. 23, 2009, 1 page.
P. McKenney, "Expedited "big hammer" RCU grace periods", LKML.org, Jun. 25, 2009, 2 pages.
P. McKenney, "RCU: The Bloatwatch Edition", LWN.net, Mar. 17, 2009, 9 pages.
M. Desnoyers, "Low-Impact Operating System Tracing", University of Montreal, PhD Thesis, Dec. 2009, 233 pages.

(56) References Cited

OTHER PUBLICATIONS

P. McKenney, "Using a Malicious User-Level RCU to Torture RCU-Based Algorithms", linux.conf.au, Jan. 2009, 51 pages.

P. McKenney et al., "Introducing Technology Into the Linux Kernel: A Case Study", Operating Systems Review, Jul. 2008, 16 pages.

P. McKenney, "What is RCU, Fundamentally", LWN.net, Dec. 17, 2007, 15 pages.

P. McKenney, What is RCU? Part 2: Usage, LWN.net, Dec. 24, 2007, 15 pages.

P. McKenney, RCU part 3: the RCU API, LWN.net, Jan. 7, 2008, 7 pages.

T. Hart et al., "Performance of memory reclamation for lockless synchronization", Journal of Parallel and Distributed Computing, Dec. 2007, pp. 1270-1285.

McKenney, "Using Promela and Spin to verify parallel algorithms", LWN.net, Aug. 1, 2007, 11 pages.

McKenney, "RCU and Unloadable Modules", LWN.net, Jan. 14, 2007, 4 pages.

\* cited by examiner

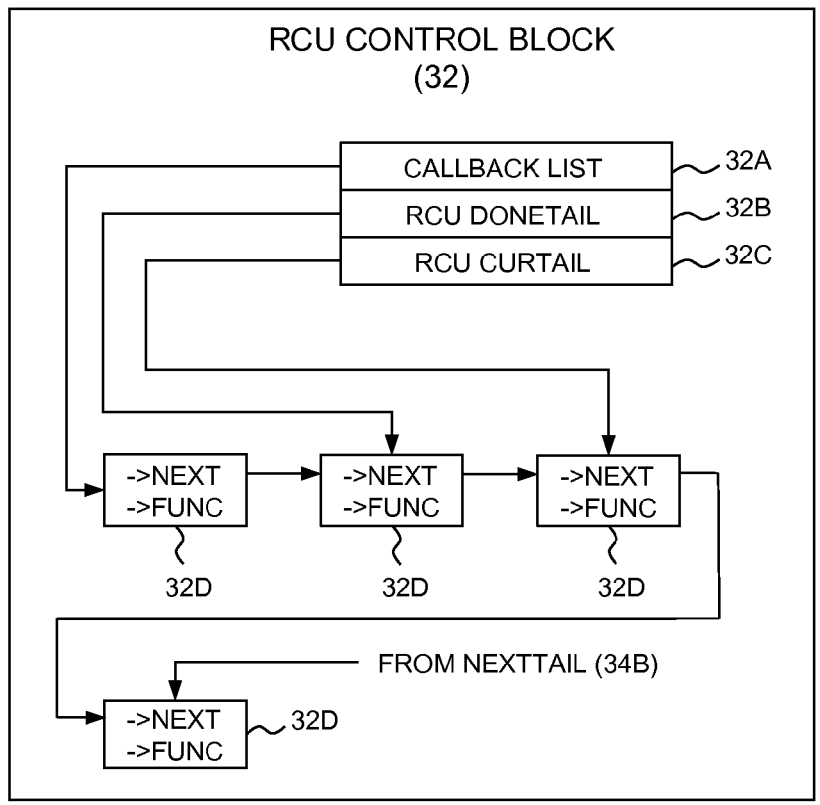
FIG. 7
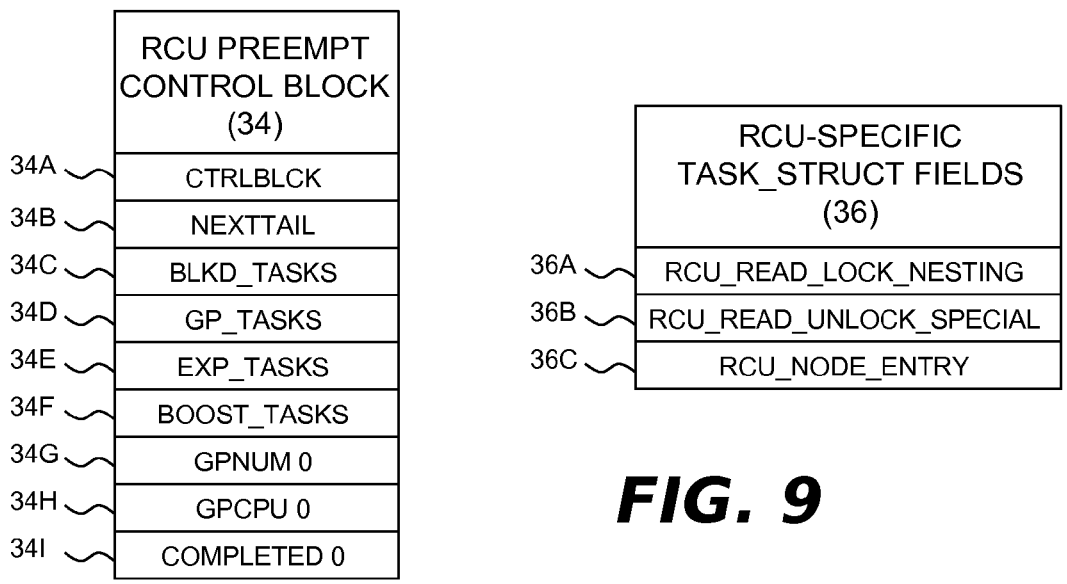
FIG. 8
FIG. 9

300

EFFECTIVE MANAGEMENT OF BLOCKED-TASKS IN PREEMPTIBLE READ-COPY UPDATE

This application is a continuation under 35 U.S.C. 120 of application Ser. No. 13/164,265, filed Jun. 20, 2011, entitled "Effective Management Of Blocked-Tasks In Preemptible Read-Copy Update."

BACKGROUND

1. Field

The present disclosure relates to computer systems and methods in which data resources are shared among data consumers while preserving data integrity and consistency relative to each consumer. More particularly, the disclosure concerns an implementation of a mutual exclusion mechanism known as "read-copy update" in a computing environment wherein the data consumers are subject to being preempted while referencing shared data.

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( )primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

At some subsequent time following the update, r1 will have continued its traversal of the linked list and moved its reference off of B. In addition, there will be a time at which no other reader process is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU running non-preemptible code (as can other operations that will not be listed here). The reason for this is that a non-preemptible kernel will always complete a particular operation (e.g., servicing a system call while running in process context) prior to a context switch.

In FIG. 3, four tasks 0, 1, 2, and 3 running on four separate CPUs are shown to pass periodically through quiescent states (represented by the double vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

Grace periods may synchronous or asynchronous. According to the synchronous technique, an updater performs the first phase update operation, blocks (waits) until a grace period has completed, and then implements the second phase update operation, such as by removing stale data. According to the asynchronous technique, an updater performs the first phase update operation, specifies the second phase update operation as a callback, then resumes other processing with the knowledge that the callback will eventually be processed at the end of a grace period. Advantageously, callbacks requested by one or more updaters can be batched (e.g., on callback lists) and processed as a group at the end of an asynchronous grace period. This allows asynchronous grace period overhead to be amortized over plural deferred update operations. In some RCU implementations, asynchronous grace period processing is the norm but a synchronous expedited grace period, sometimes referred to as a "Big Hammer" grace period, is also available for updaters that need it. This expedited grace period forces a context switch (and thus a quiescent state) on each processor so that an updater can quickly perform its second-phase update operation. Existing callbacks associated with asynchronous grace periods are not affected. They must await the end of an asynchronous grace period before becoming ripe for processing.

It will be appreciated from the foregoing discussion that the fundamental operation of the RCU synchronization technique entails waiting for all readers associated with a particular grace period to complete. Multiprocessor implementations of RCU must observe or influence the actions performed by multiple processors, whereas uniprocessor implementations do not. In so-called "non-preemptible" variants of RCU, readers are never preempted and rescheduled within an RCU read-side critical section. Orderly grace period processing in such implementations may then be ensured by either forcing or waiting for each reader's processor to pass through a quiescent state.

The situation is different for so-called "preemptible" variants of RCU wherein readers are subject to preemption within RCU read-side critical sections. In that case, a context switch will occur but will not constitute a quiescent state as in the case of non-preemptible RCU. For example, in a preemptible operating system kernel, the servicing of a system call during process context could be interrupted by a higher priority task while the system call code is in the midst of an RCU read-side critical section. In this situation, other techniques are required to track quiescent states. The approach most often used is to treat all reader processing outside of an RCU read-side critical section as a quiescent state, and to provide some form of tracking methodology that allows readers to specify when they are performing RCU read-side critical section processing. A grace period will not end until all readers being tracked in this manner indicate that they have completed such processing. Throughout the present document, readers that are preempted within an RCU read-side critical section will also be referred to as "blocked" readers.

Unfortunately, separate tracking of preempted readers is typically required for asynchronous grace periods and synchronous expedited grace periods because there is not necessarily any direct relation between the two. They might overlap, be disjoint, or have one wholly contained within the other. This separate tracking complicates RCU grace period detection processing. Preemptible readers may also be tracked in order to determine which readers are tardy in completing their RCU read-side critical section processing and thus may be blocked by a higher priority process. Such preempted readers can be given a scheduling priority boost in RCU implementations that support such functionality. Without a priority boost, such readers could delay the end of a current grace period, potentially leading to problems such as an out-of-memory (OOM) condition caused by excessive callback accumulation. Unfortunately, tracking preemptible readers for possible priority boosting further complicates RCU grace period detection processing.

In conventional RCU implementations, the tracking of preemptible readers has been accomplished using a number of methods. According to one such technique, per-processor counters track the number of still-in-progress RCU read-side critical sections that began on the corresponding processors (see P. McKenney et al., "Extending RCU for Realtime and Embedded Workloads", Aug. 11, 2006). According to a variant of this technique, per-processor counters track the difference between the number of RCU read-side critical sections that began on a given processor and the number of RCU read-side critical sections that ended on that same processor (see Id.; P. McKenney, "The Design of Preemptible Read-Copy Update", Aug. 7, 2007). Both of the foregoing techniques have several shortcomings, to wit: (1) expensive atomic operations and memory barriers are required in RCU read-side primitives; (2) there is no convenient way to determine which tasks block an expedited grace period, and (3) there is no convenient way to determine which tasks need priority boosting in order to permit the current grace period to end.

One existing RCU implementation augments the above counter-based techniques with a set of lists linking together tasks that blocked while in an RCU read-side critical section during a given time period. Tasks that block and then remain in the RCU read-side critical section for too long are priority boosted (see P. McKenney, "Priority-Boosting RCU Read-Side Critical Sections", Apr. 16, 2007). This technique also has shortcomings, namely: (1) because there is no direct connection between grace periods and time periods, this approach can boost tasks that do not need to be boosted (unnecessarily delaying execution of real-time tasks), and also can unnecessarily delay boosting tasks that do need to be boosted, (2) there is no convenient way to determine which tasks block an expedited grace period, and (3) the array of lists consumes considerable memory, which can be a problem on embedded platforms.

According to a further existing RCU implementation, any task that is preempted while in an RCU read-side critical section is given an immediate priority boost (see S. Rostedt, "[RFC PATCH] RFC Preemption Priority Boosting", Oct. 3, 2007). A disadvantage of this approach is that tasks may be priority boosted that do not need it, thereby unnecessarily delaying execution of real-time tasks.

A still further existing RCU implementation, known as hierarchical RCU, maintains an array [ ] of four blocked reader lists. The first list tracks readers that block neither the current synchronous nor the current asynchronous grace periods, the second list tracks readers that block the current synchronous grace period but not the current asynchronous grace period, the third list tracks readers that do not block the current synchronous grace period but do block the current asynchronous grace period, and the fourth list tracks readers that block both the current synchronous and the current asynchronous grace periods (see I. Molnar et al. "Linux/kernel/rcutree.h", 2008, lines 120-124 ("struct list_head blocked_tasks[4]" field of "struct rcu_node" data structure). A disadvantage of this approach is that four separate lists must be managed. Also, there are no lists tracking boosted readers. However, commonly owned U.S. Patent Application Publication No. 2011/0055183 discloses that two boost lists (respectively indexed to the current and previous asynchronous grace periods) may be used in conjunction with blocked reader tracking However, combining boost list tracking with the four-list blocked reader tracking system of Hierarchical RCU, would double the existing four lists to a total of eight lists. This is because each of the existing four lists would have a boost list counterpart to identify blocked readers that have been boosted.

SUMMARY

A method, system and computer program product are provided for managing read-copy update readers that have been preempted while executing in a read-copy update read-side critical section. Advantageously, a single blocked-tasks list is used to track preempted reader tasks that are blocking an asynchronous grace period, preempted reader tasks that are blocking an expedited grace period, and preempted reader tasks that require priority boosting. In an example embodiment, a first pointer may be used to segregate the blocked-tasks list into preempted reader tasks that are and are not blocking a current asynchronous grace period. A second pointer may be used to segregate the blocked-tasks list into preempted reader tasks that are and are not blocking an expedited grace period. A third pointer may be used to segregate the blocked-tasks list into preempted reader tasks that do and do not require priority boosting.

In an example embodiment, the blocked-tasks list may be ordered such that (1) the first pointer references a first preempted reader task on the blocked-tasks list that is a newest preempted reader task blocking a current asynchronous grace period, and all preempted reader tasks that follow the first preempted reader task are also blocking the current asynchronous grace period, (2) the second pointer references a second preempted reader task on the blocked-tasks list that is a newest preempted reader task blocking an expedited grace period, and all preempted reader tasks that follow the second preempted reader task are also blocking the expedited grace period, and (3) the third pointer references a third preempted reader task on the blocked-tasks list that is a newest preempted reader task that requires priority boosting, and all preempted reader tasks that follow the third preempted reader task also require priority boosting.

In an example embodiment, the first preempted reader task, the second preempted reader task, and the third preempted reader task may either be one and the same task or they may be different tasks. In the example embodiments, the blocked-tasks list may be further ordered such that all preempted reader tasks that are ahead of the first preempted reader task are blocking a subsequent asynchronous grace period that follows the current asynchronous grace period. In the example embodiments, the above-described technique may be used in either a uniprocessor computer system or a multiprocessor computer system. In a uniprocessor system, the blocked-tasks list can be ordered to maintain all preempted reader tasks in strict reverse time order. In a multiprocessor system, the blocked-tasks list can be ordered to maintain all preempted reader tasks starting from the first preempted reader task in strict reverse time order.

In an example embodiment, one or more data structures may be provided that each maintain an instance of the blocked-tasks list, the first pointer, the second pointer and the third pointer one behalf of at least one processor. Each data structure may further maintain a grace period number, a quiescent state indicator and a grace period completed indicator on behalf of the least one processor.

BRIEF DESCRIPTION OF THE DRAWINGS

The foregoing and other features and advantages will be apparent from the following more particular description of example embodiments, as illustrated in the accompanying Drawings, in which:

FIG. 7 is a block diagram showing an example RCU control block data structure that may be used to perform grace period processing in accordance with the present disclosure;

FIG. 8 is a block diagram showing an example RCU preempt control block that may be used to perform grace period processing in accordance with the present disclosure;

FIG. 9 is a block diagram showing example reader task structure fields that may be used to perform grace period processing in accordance with the present disclosure;

DETAILED DESCRIPTION OF EXAMPLE EMBODIMENTS

Introduction

Applicant has invented an improvement in RCU grace period detection processing that supports exact determination of which RCU reader tasks that have been preempted during an RCU read-side critical section are (1) blocking a current asynchronous grace period, (2) blocking a current synchronous expedited grace period, or (3) in need of priority boosting. In example embodiments, the improvement utilizes a simple, small and fast data structure to track such blocked tasks, and provides routines that manipulate the fields of this blocked-task data structure as each grace period progresses to completion. The improvement has applicability to both uniprocessor and multiprocessor environments, with the uniprocessor environment utilizing one blocked-task data structure and the multiprocessor environment utilizing plural blocked-task data structures that are each assigned to a group of processors.

According to the example embodiments, the blocked-task data structure utilizes a single doubly linked list of tasks to optimally track blocked readers and their relationships to asynchronous grace periods, expedited grace periods, and priority boosting. Intelligent list insertion and pointers are used to segregate the blocked task list into (1) tasks that do/don't block the current asynchronous grace period, (2) tasks that do/don't block the current expedited grace period, and (3) tasks that do/don't require priority boosting. A priority boost routine performs incremental priority boosting given the potential large numbers of tasks that may be in need of boosting, thereby avoiding unnecessarily delay of real-time tasks.

Normal-case low-overhead read-side processing with occasional special-case blocked reader handling is also implemented using techniques evolved from commonly-owned U.S. Patent Application Publication No. 2011/0055183 and the existing hierarchical RCU implementation mentioned in the "Background" section above.

Example Embodiments

Figure 1A:
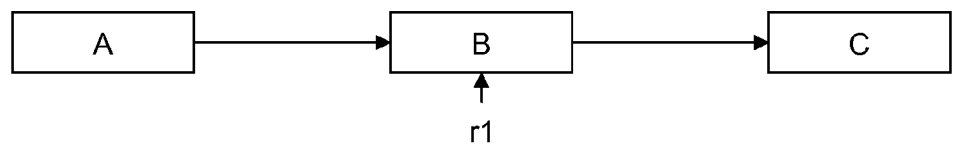
FIGS. 1A-1D are diagrammatic representations of a linked list of data elements undergoing a data element replacement according to a conventional read-copy update mechanism.
Figure 1B:
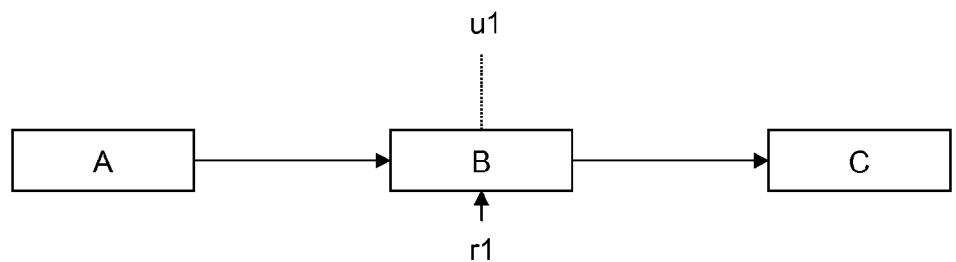
Figure 1C:
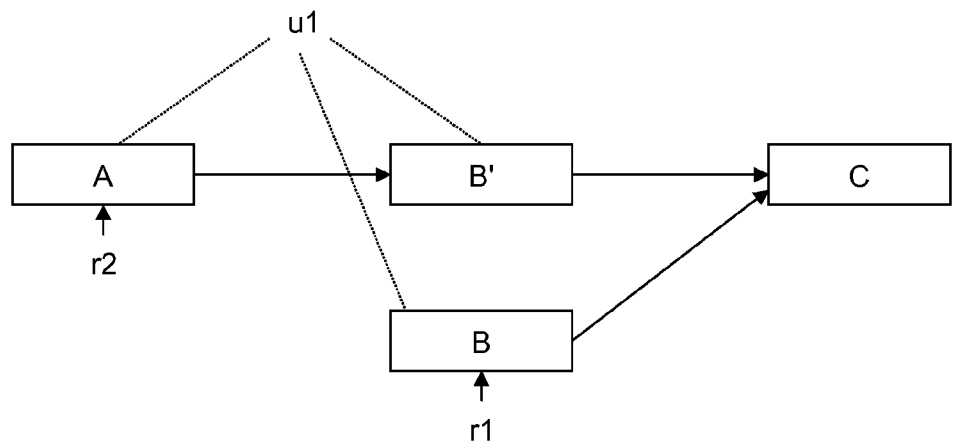
Figure 1D:
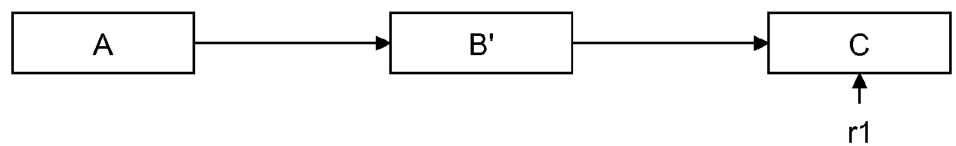
Figure 2A:
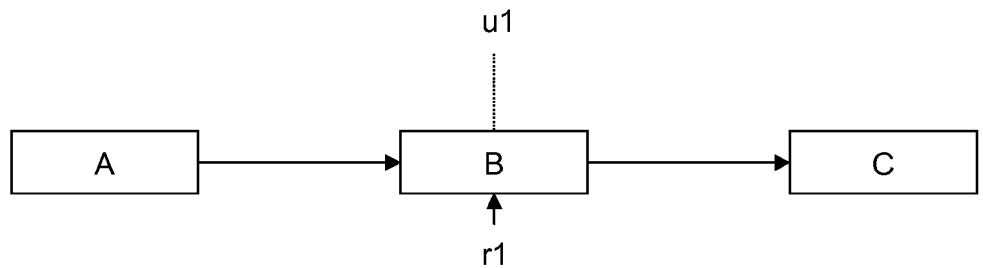
FIGS. 2A-2C are diagrammatic representations of a linked list of data elements undergoing a data element deletion according to a conventional read-copy update mechanism.
Figure 2B:
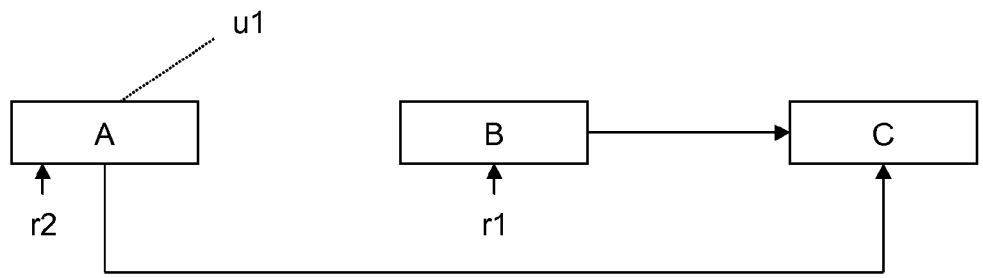
Figure 2C:
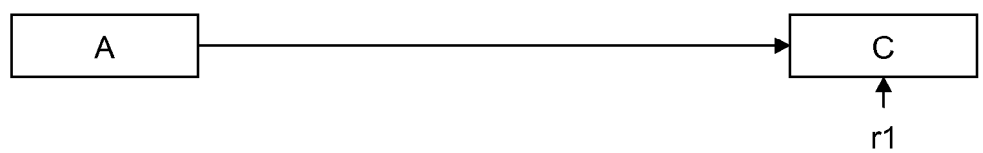
Figure 3:
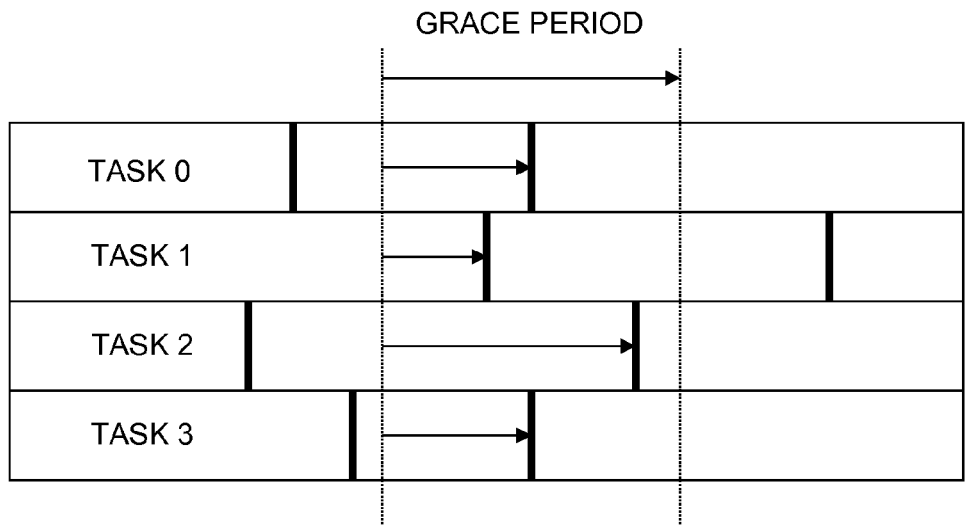
FIG. 3 is a flow diagram illustrating a grace period in which four processes pass through a quiescent state.
Figure 4:
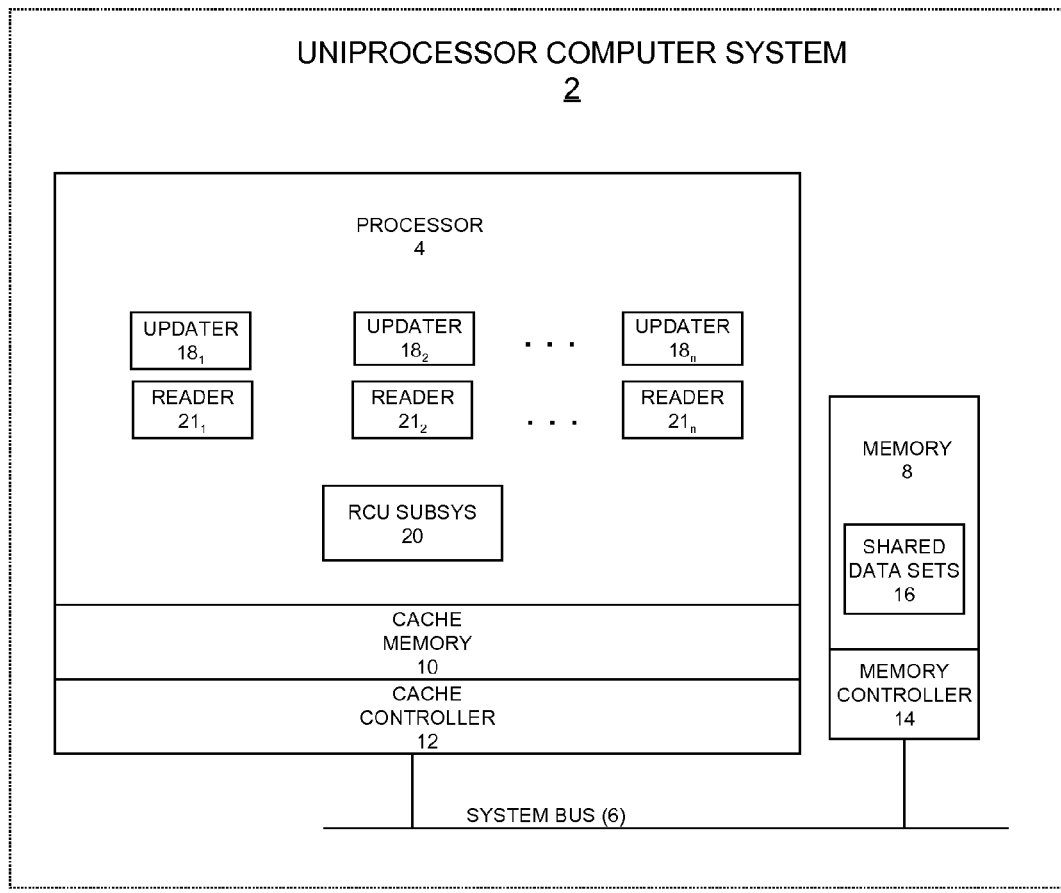
FIG. 4 is a functional block diagram showing a uniprocessor computing system that may be implemented in accordance with the present disclosure.
Figure 5:
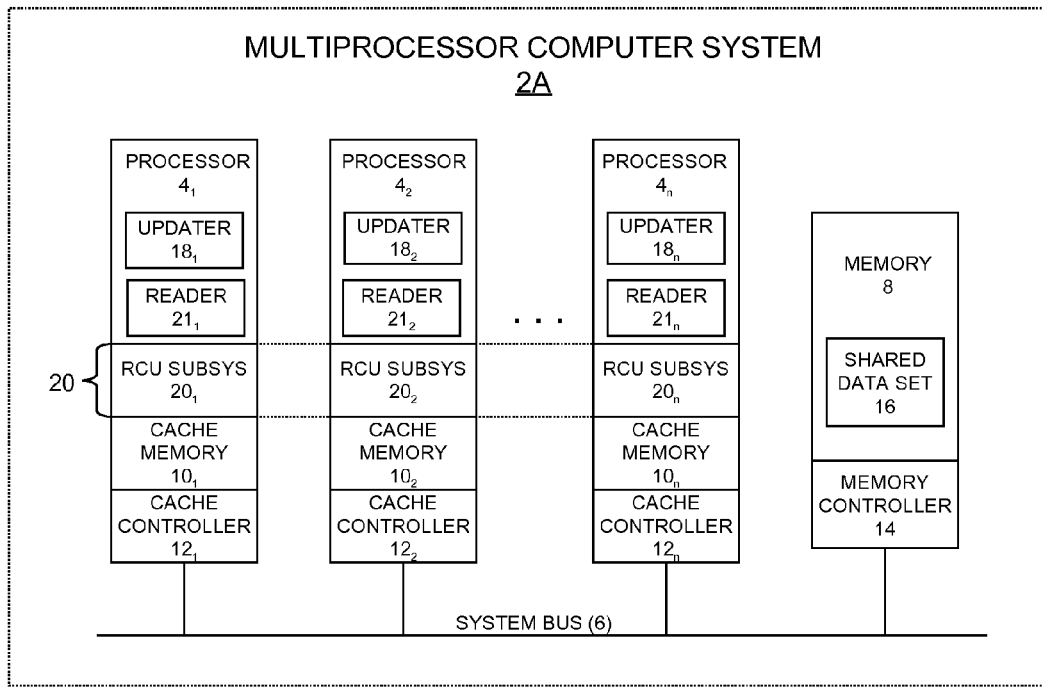
FIG. 5 is a functional block diagram showing a multiprocessor computing system that may be implemented in accordance with the present disclosure.

Turning now to the figures, wherein like reference numerals represent like elements in all of the several views, FIGS. 4 and 5 respectively illustrate example uniprocessor and multiprocessor computing environments in which the grace period processing technique described herein may be implemented. In FIG. 4, a uniprocessor computing system 2 includes a single processor 4, a system bus 6 (or other interconnection pathway) and a program memory 8. A conventional cache memory 10 and a cache controller 12 are associated with the processor 4. A conventional memory controller 14 is associated with the memory 8. As shown, the memory controller 14 may reside separately from processor 4 (e.g., as part of a chipset). Alternatively, the memory controller 14 could be integrated with the processor 4 (as is known in the art). In FIG. 5, a multiprocessor computing system 2A includes multiple processors $4_1, 4_2 \ldots 4_n$, a system bus 6, and a program memory 8. There are also cache memories $10_1, 10_2 \ldots 10_m$ and cache controllers $12_1, 12_2 \ldots 12_n$ respectively associated with the processors $4_1, 4_2 \ldots 4_n$. A conventional memory controller 14 is again associated with the memory 8. As shown, the memory controller 14 may reside separately from processors $4_2 \ldots 4_n$ (e.g., as part of a chipset). Alternatively, the memory controller 14 could be provided by plural memory controller instances respectively integrated with the processors $4_2 \ldots 4_n$ (as is known in the art).

In each of FIGS. 4 and 5, the example computing systems 2 and 2A may represent any of several different types of computing apparatus. Such computing apparatus may include, but are not limited to, general purpose computers, special purpose computers, portable computing devices, communication and/or media player devices, set-top devices, embedded systems, to name but a few. In FIG. 4, the processor 4 may be implemented as a single-core CPU (Central Processing Unit) device. In FIG. 5, the processors $4_1, 4_2 \ldots 4_n$ may each be a single-core CPU device. Alternatively, the processors $4_1, 4_2 \ldots 4_n$ could represent individual cores within a multi-core CPU device. Each CPU device embodied by any given processor 4 of FIGS. 4 and 5 is operable to execute program instruction logic under the control of a software program stored in the memory 8 (or elsewhere). The memory 8 may comprise any type of tangible storage medium capable of storing data in computer readable form, including but not limited to, any of various types of random access memory (RAM), various flavors of programmable read-only memory (PROM) (such as flash memory), and other types of primary storage. In FIG. 4, the processors 4 and the memory 8 may be situated within a single computing device or node. In FIG. 5, the processors $4_1, 4_2 \ldots 4_n$ may be situated within a single computing device or node (e.g., as part of a single-node SMP system) or they may be distributed over plural nodes (e.g., as part of a NUMA system, a cluster, a cloud, etc.).

An update operation (updater) 18 may periodically execute within a process, thread, or other execution context (hereinafter "task") on any processor 4 of FIGS. 4 and 5. Each updater 18 runs from program instructions stored in the memory 8 (or elsewhere) in order to periodically perform updates on a set of shared data 16 that may be stored in the shared memory 8 (or elsewhere). FIG. 4 illustrates a single updater 18 executing on the lone processor 4. In FIG. 5, reference numerals $18_1, 18_2 \ldots 18_n$ illustrate individual data updaters that may periodically execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 of FIGS. 4 and 5 are programmed from instructions stored in the memory 8 (or elsewhere) to implement a read-copy update (RCU) subsystem 20 as part of their processor functions. FIG. 4 illustrates a single RCU subsystem executing on the lone processor 4. In FIG. 5, reference numbers $20_1, 20_2 \ldots 20_n$ represent individual RCU instances that may periodically execute on the several processors $4_1, 4_2 \ldots 4_n$. Any given processor 4 in FIGS. 4 and 5 may also periodically execute a read operation (reader) 21. Each reader 21 runs from program instructions stored in the memory 8 (or elsewhere) in order to periodically perform read operations on the set of shared data 16 stored in the shared memory 8 (or elsewhere). FIG. 4 illustrates a single reader 21 executing on the lone processor 4. In FIG. 5, reference numerals $21_1, 21_2 \ldots 21_n$ illustrate individual reader instances that may periodically execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element. The updaters 18 and the readers 21 are further assumed to be preemptible and the systems 2 and 2A may, for example, support real-time operations.

During run time, an updater 18 will occasionally perform an update to one of the shared data elements 16. In accordance the philosophy of RCU, a first-phase update is performed in a manner that temporarily preserves a pre-update view of the shared data element for the benefit of readers 21 that may be concurrently referencing the shared data element during the update operation. Following the first-phase update, the updater 18 may register a callback with the RCU subsystem 20 for the deferred destruction of the pre-update view following a grace period (second-phase update). As described in the "Background" section above, this is known as asynchronous grace period processing. In some cases, an updater 18 may perform an update, request an expedited grace period, and block until the expedited grace period has elapsed. As also mentioned in the "Background" section, an expedited grace period is a form of synchronous grace period processing.

The RCU subsystem 20 handles both asynchronous and synchronous grace periods. Each type of grace period processing entails starting new grace periods and detecting the end of old grace periods so that the RCU subsystem 20 knows when it is safe to free stale data (or take other actions). Asynchronous grace period processing further entails the management of callback lists that accumulate callbacks until they are ripe for batch processing at the end of a given grace period. An additional function of the RCU subsystem 20 is to identify and boost the priority of readers 21 that may be holding up the expiration of a grace period. All of the foregoing grace period processing operations may be performed by periodically running the RCU subsystem 20 on the lone processor 4 in FIG. 4 or on each of the several processors $4_1, 4_2 \ldots 4_n$ in FIG. 5. As described in more detail below, different components of the RCU subsystem 20 may be variously invoked by an operating system scheduler, a scheduling clock interrupt handler, in process context, and in bottom half context.

Figure 6:
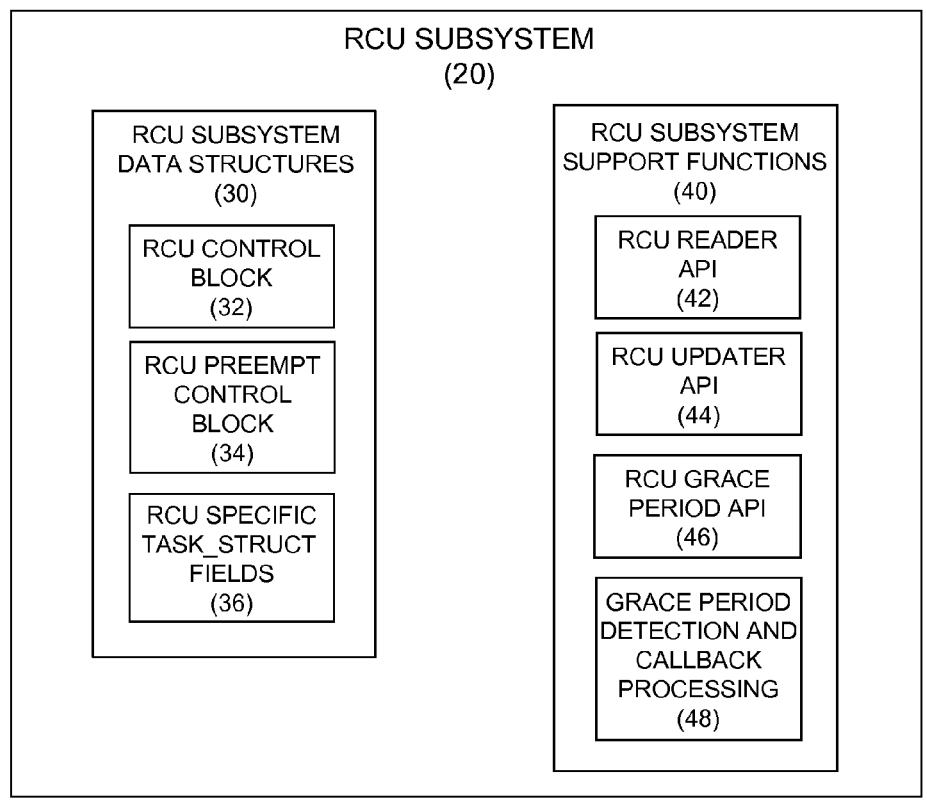
FIG. 6 is a functional block diagram showing an RCU subsystem that may be provided in the computer systems of FIGS. 4 and 5.

Turning now to FIG. 6, example components of the RCU subsystem 20 are shown. These components include several RCU subsystem data structures 30, namely, an RCU control block 32, an RCU preempt control block 34, and several RCU-specific fields 36 in each reader's task structure (e.g., a task_struct data structure in the Linux® kernel). The components of the RCU subsystem 20 also include several RCU subsystem support functions 40, namely, an RCU reader API (Application Programming Interface) 42, an RCU updater API 44, an RCU grace period invocation API 46 and a set of grace period detection and callback processing functions 48.

FIG. 7 illustrates an example RCU control block 32. This data structure finds correspondence in conventional RCU implementations under the names "rcu_ctrlblk" (for non-hierarchical RCU) and "$rcu_{13}$ data" (for hierarchical RCU). Information that may be maintained by the RCU control block 32 includes an RCU callback list head pointer 32A, an RCU donetail pointer 32B, and an RCU curtail pointer 32C. These pointers are used for callback batch handling. They are sometimes referred to by different names in different RCU implementations. Moreover, some RCU implementations use additional callback list-related pointers that are not shown in FIG. 7. The RCU callback list head pointer 32A references the first callback 32D on a list (the "RCU callback list") of all outstanding RCU callbacks 32D. Although FIG. 7 shows four callbacks 32D, this is for purposes of illustration only and not by way of limitation. As is conventionally known, each callback 32D may be implemented with a list_head pointer (<>next) to the next callback on the RCU callback list, and a pointer (->func) to a callback processing function. In an example embodiment, each callback 32D may be coded in software as an rcu_head structure using the following C programming declaration:

```
struct rcu_head {
    struct rcu_head *next;
    void (*func)(struct rcu_head *head);
};
```

The RCU donetail pointer 32B references the ->next pointer of the last callback 32D on the RCU callback list whose asynchronous grace period has completed and is thus ready to be invoked. This portion of the RCU callback list may be referred to as the "donelist." The donelist extends from the first callback referenced by the RCU callback list head pointer 32A to the callback whose ->next pointer is referenced by the RCU donetail pointer 32B. In the example illustration of FIG. 7, there are two callbacks 32D on the donelist, namely, a first callback referenced by the RCU callback list head pointer 32A and a second callback whose ->next pointer is referenced by the RCU donetail pointer 32B. During times when there are no callbacks on the donelist, the RCU donetail pointer 32B may be initialized to point to the RCU callback list head pointer 32A. The RCU curtail pointer 32C references the ->next pointer of the last call back 32D that is waiting for the current asynchronous grace period to end. This portion of the RCU callback list may be referred to as the "curlist." The curlist extends from the first callback following the tail of the donelist pointer 32B to the callback whose ->next pointer is referenced by the RCU curtail pointer 32C. In the example illustration of FIG. 7, there is one callback 32D on the curlist, namely, the third callback whose ->next pointer is referenced by the RCU curtail pointer 32C.

During times when there are no callbacks on the curlist, the RCU curtail pointer 32B may be initialized to point to the RCU callback list head pointer 32A. As further described in connection with FIG. 8, there is a third portion of the callback list that follows the curlist. This list portion may be referred to as the "nextlist," and the ->next pointer of its tail callback is referenced by a pointer maintained in the RCU preempt control block 34. Alternatively, the ->next pointer could be maintained in the RCU control block 32, but would be wasteful of memory when compiling for non-preemptible, uniprocessor RCU (which does not need a nextlist). In an example embodiment, the RCU control block 32 may be coded in software using the following C programming language declaration:

```
struct rcu_ctrlblk {
    struct rcu_head *rcucblist;    /* List of pending callbacks (CBs). */
    struct rcu_head **donetail;    /* ->next pointer of last "done" CB. */
    struct rcu_head **curtail;     /* ->next pointer of last CB. */
};
```

By segregating the RCU callback list into separate donetail, curtail and nexttail portions, each list portion can be processed in separate stages in conjunction with separate grace periods. This allows new callbacks to safely accumulate while other callbacks are being processed. For example, at the end of a given grace period, all callbacks on the donelist will be ready to be invoked. As discussed below, the callback handler that actually processes such callbacks could be (and usually is) executed in a deferred manner (such as in softirq context or kthread (kernel thread) context). It would not be appropriate to process additional callbacks that are registered after a processor quiescent state but before the commencement of deferred callback processing. Such callbacks could, for example, have been registered from within an interrupt handler that was invoked between the time that the quiescent state occurred and the deferred callback handler started executing. Meanwhile, there could be a reader 21 that entered an RCU read-side critical section and is now referencing the data associated with one or more of the new callbacks. By placing new callbacks on the curlist and waiting for a subsequent grace period to end, the reader can be protected. The additional nextlist is used to handle callbacks that are registered while there are blocked readers preventing the end of the grace period. Note that the grace period does not actually conclude until the blocked readers have resumed execution and completed their RCU read-side critical sections. During this time period, new callbacks are placed on the nextlist to await the next grace period. The management of callbacks on the donelist, curlist and nextlist is further discussed below, particularly in connection with FIG. 16, which describes an example of how callbacks may be advanced on the RCU callback list, and FIG. 19, which describes an example of how callbacks may be processed.

FIG. 8 illustrates an embodiment of the RCU preempt control block 34 for the uniprocessor system 2 of FIG. 4. A multiprocessor embodiment of this data structure for use with the multiprocessor system 2A of FIG. 5 is described in more detail below in connection with FIG. 24. In the uniprocessor embodiment of the RCU preempt control block 34, all fields of the data structure are protected by disabling interrupts. In the multiprocessor embodiment of the RCU preempt control block 34, access to the data structure fields requires a lock. This lock is acquired only during grace period processing or when a reader 21 that was preempted during its current RCU read-side critical section exits that critical section. This means that readers need not acquire the lock in the common case, and lock contention should be low. On systems with large numbers of CPUs (hundreds), a hierarchical RCU scheme may be used to maintain a low level of lock contention.

The RCU preempt control block 34 is the data structure mentioned in the "Introduction" section above. It is used to track which readers 21 are (1) blocking a current asynchronous grace period, (2) blocking a current synchronous expedited grace period, or (3) in need of priority boosting. This data structure also tracks the beginning and end of asynchronous grace periods, and notes when processor quiescent states have occurred. Advantageously, there is no combinatorial explosion of lists required to track these three categories of readers. As previously stated, blocked reader tracking may be performed with a single easy-to-manage list.

In an example embodiment, the RCU preempt control block 34 may be implemented as a data structure comprising nine fields 34A-34I. The first field 34A, labeled "ctrlblk," is a pointer to the RCU control block 32 discussed above. The second field 34B, labeled "nexttail," is a pointer to the ->next pointer of the last callback 32D that must wait for an asynchronous grace period following the current asynchronous grace period, i.e., after the next grace period. The callback whose ->next pointer is pointed to by the RCU nexttail pointer 34B marks the end of the nextlist portion of the RCU callback list. This is where new callbacks are added by updaters 18. In the example illustration of FIG. 7, there is one callback 32D on the nextlist, namely, the fourth callback whose ->next pointer is referenced by the RCU nexttail pointer 34B. During times when there are no callbacks on the nextlist, the RCU nexttail pointer 34B may be initialized to point to the RCU callback list head pointer 32A.

The third field 34C, labeled "blkd_tasks," is the head of a doubly-linked blocked-tasks list of all readers 21 that are currently blocked within an RCU read-side critical section. In an example embodiment, the blkd_tasks list header 34C may be implemented as a conventional list_head data structure. The fourth field 34D, labeled "gp_tasks," is a pointer to the first element on the blocked-tasks list that is preventing the current asynchronous grace period from completing. The fifth field 34E, labeled "exp_tasks," is a pointer to the first element on the blocked-tasks list that is preventing the current expedited grace period from completing. The sixth field 34F, labeled "boost_tasks," is a pointer to the first element on the blocked-tasks list that needs to be priority boosted.

The seventh field 34G, labeled "gpnum," indicates the number of the most recently started asynchronous grace period. The eighth field 34H, labeled "gpcpu," indicates the number of the asynchronous grace period to which the processor 4 has most recently responded. It is effectively a quiescent state indicator that signifies to the RCU subsystem 20 whether a processor quiescent state has been reached in which a context switch occurred. The condition where gpcpu=gpnum signifies that the processor has passe through a quiescent state. Note that a processor quiescent state does not necessarily mean that a grace period has ended because one or more readers 21 may have been preempted within their RCU read-side critical sections. Instead, the processor quiescent state may be thought of as marking the beginning of the end of the current grace period. A multiprocessor alternative to the gpcpu field 34H is described in more detail below in connection with FIG. 24. The ninth field 34I, labeled "completed," indicates the number of the asynchronous grace period that has most recently completed. The condition where completed=gpnum signifies that there is no grace period in progress.

In an example embodiment, the RCU preempt control block 34 may be coded in software using the following C programming language declaration:

```
struct
rcu_preempt_ctrlblk {
    struct rcu_ctrlblk      /* curtail: ->next ptr of last CB for GP. */
    rcb;
    struct rcu_head
    **nexttail;
                            /* Tasks blocked in a preemptible RCU */
                            /* read-side critical section while a */
                            /* preemptible-RCU grace period is in */
                            /* progress must wait for a later grace */
                            /* period. This pointer points to the */
                            /* ->next pointer of the last callback that */
                            /* must wait for a later grace period, or */
                            /* to &->rcb.rcucblist if there is no */
                            /* such task. */
    struct list_head
    blkd_tasks;
                            /* Tasks blocked in RCU read-side critical */
                            /* section. Tasks are placed at the head */
                            /* of this list and age towards the tail. */
    struct list_head
    *gp_tasks;
                            /* Pointer to the first task blocking the */
                            /* current grace period, or NULL if there */
                            /* is no such task. */
    struct list_head
    *exp_tasks;
                            /* Pointer to first task blocking the */
                            /* current expedited grace period, or NULL */
                            /* if there is no such task. If there */
                            /* is no current expedited grace period, */
                            /* then there cannot be any such task. */
    u8 gpnum;               /* Current grace period. */
    u8 gpcpu;               /* Last grace period blocked by the CPU. */
    u8 completed;           /* Last grace period completed. */
};
```

FIG. 9 illustrates the RCU-specific task structure fields 36 (collectively referred to hereinafter as the "task structure 36"). In the illustrated embodiment, there are three fields 36A-36C that may be added to the task structure 36 of each reader 21. In particular, the first field 36A, labeled "rcu_read_lock_nesting," is a counter that is respectively incremented and decremented by readers as they enter and leave their RCU read-side critical sections. One advantage of using a counter for the rcu_read_lock_nesting field 36A is that it can track a reader nesting count when RCU read-side critical sections are nested. Other data types could also be used. This field indicates whether a reader 21 is inside an RCU read-side critical section or is outside of its outermost RCU read-side critical section and therefore in a quiescent state relative to the RCU subsystem 20. The second reader task structure field 36B, labeled "rcu_read_unlock_special," is a flag field that is used to set any of the following three flags:

(1) RCU_READ_UNLOCK_BLOCKED;
(2) RCU_READ_UNLOCK_NEED_QS;
(3) RCU_READ_UNLOCK_BOOSTED.

The RCU_READ_UNLOCK_BLOCKED flag indicates to the RCU subsystem 21 that a reader 21 was preempted within its RCU read-side critical section. This flag may be defined to have any suitable value, such as "1." The RCU_READ_UNLOCK_NEED_QS flag indicates to the RCU subsystem 20 that the reader 21 needs to pass through a quiescent state in order start the completion of an asynchronous grace period (so that callbacks may be processed). This flag may be defined to have any suitable value, such as "2." The RCU_READ_UNLOCK_BOOSTED flag indicates to the RCU subsystem 20 that the reader 21 needs a priority boost. This flag may be defined to have any suitable value, such as "4."

The third field 36C, labeled "rcu_node_entry," may be implemented as a pointer to a conventional list_head structure. It is used to enqueue a blocked reader 21 on the blocked-tasks list.

In an example embodiment, the foregoing fields of the reader task structure 36 may be coded in software using the following C programming language declaration:

```
struct task struct {
    ...
    int rcu_read_lock_nesting;
    int rcu_read_unlock_special;
    struct list_head *rcu_node_entry;
    ...
};
```

Figure 10A:
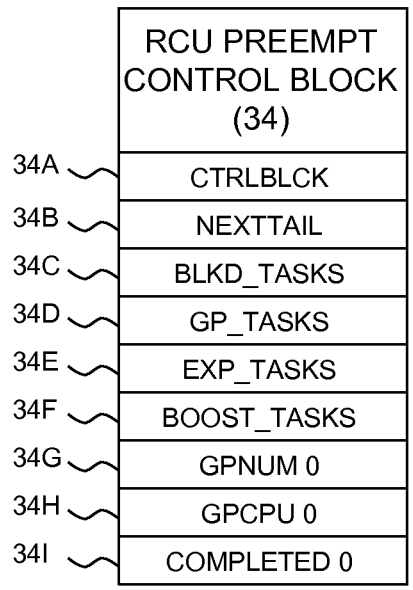
FIGS. 10-10P are block diagrams showing example information that may be tracked by the RCU preempt control block of FIG. 8.
Figure 10B:
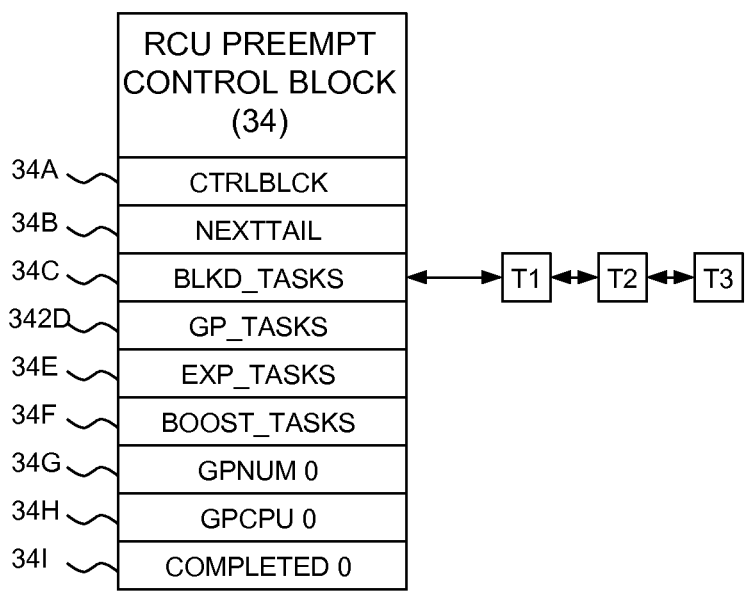
Figure 10C:
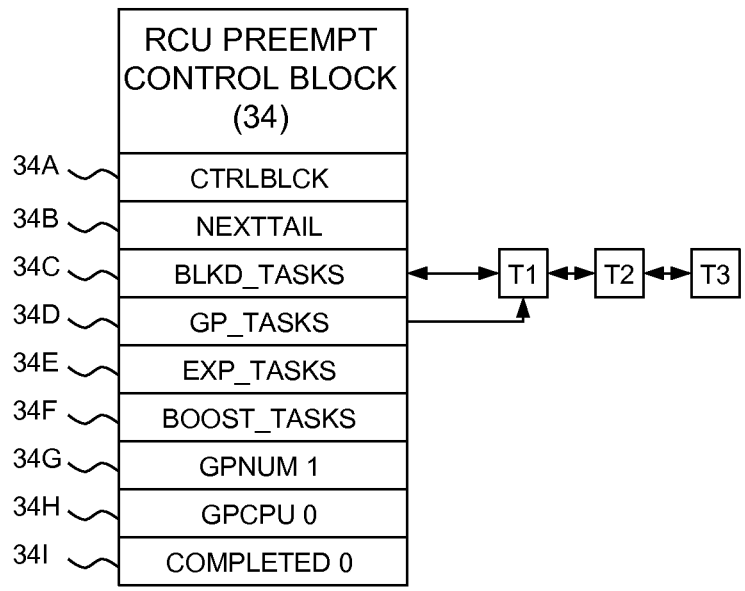
Figure 10D:
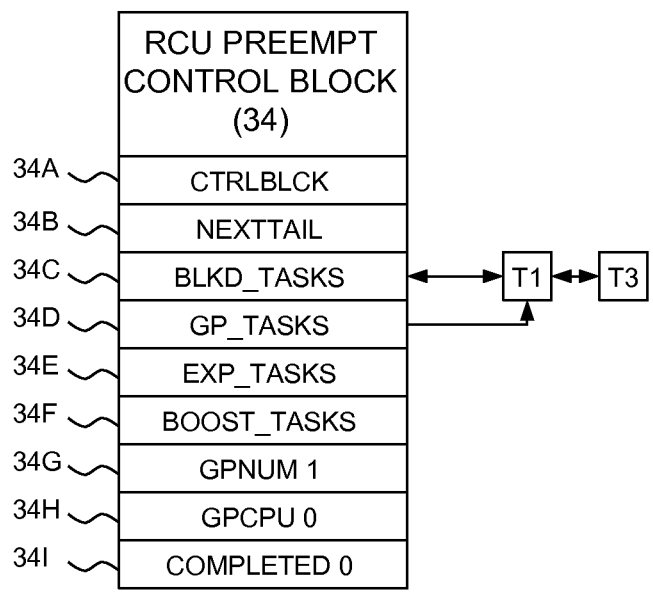
Figure 10E:
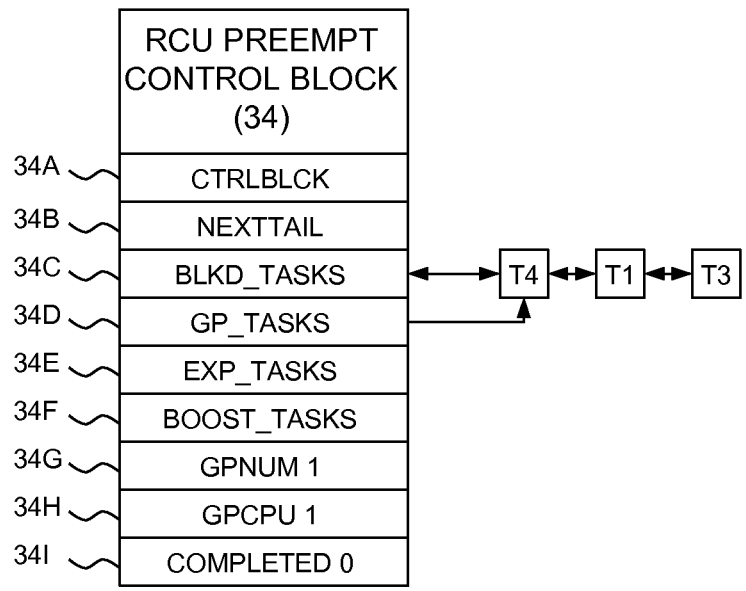
Figure 10F:
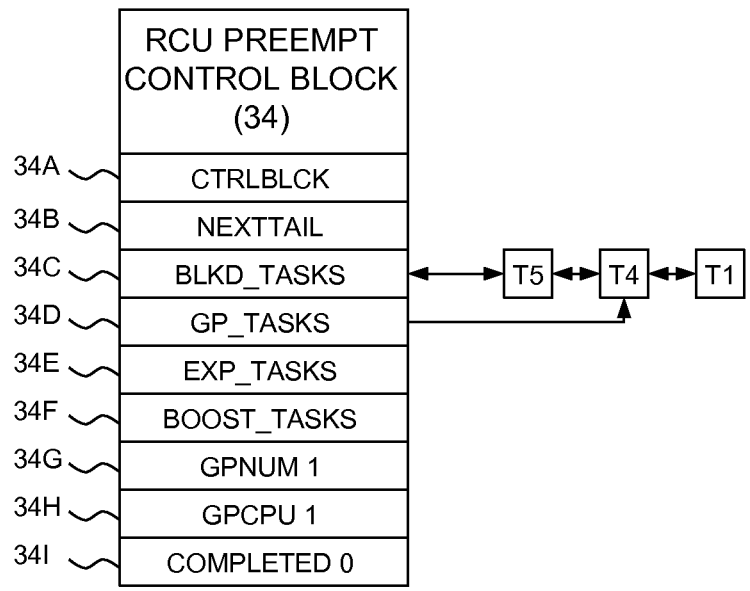
Figure 10G:
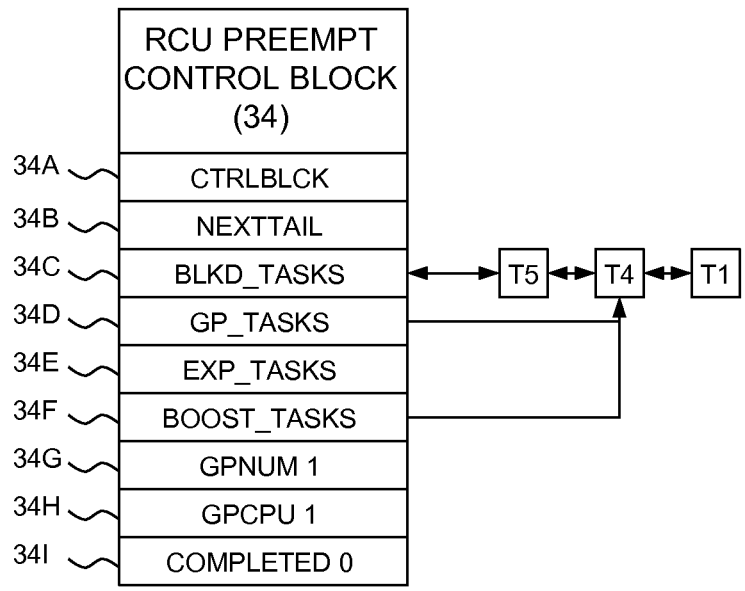
Figure 10H:
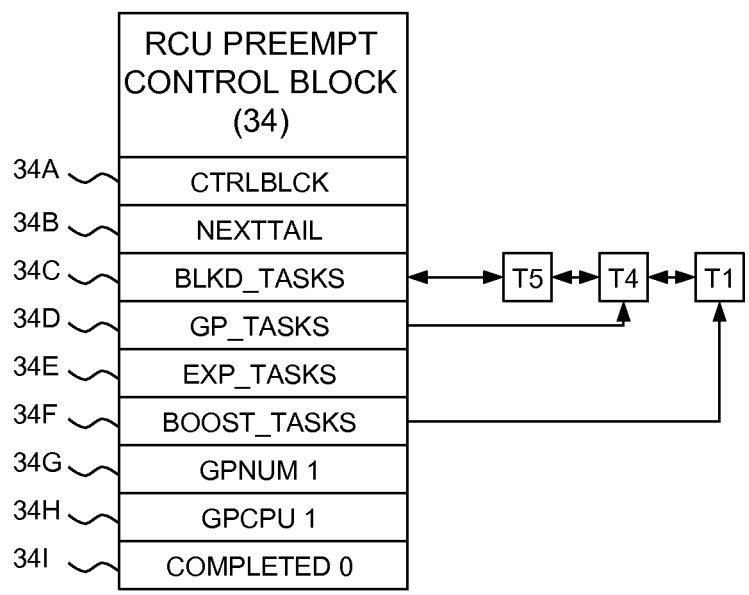
Figure 10I:
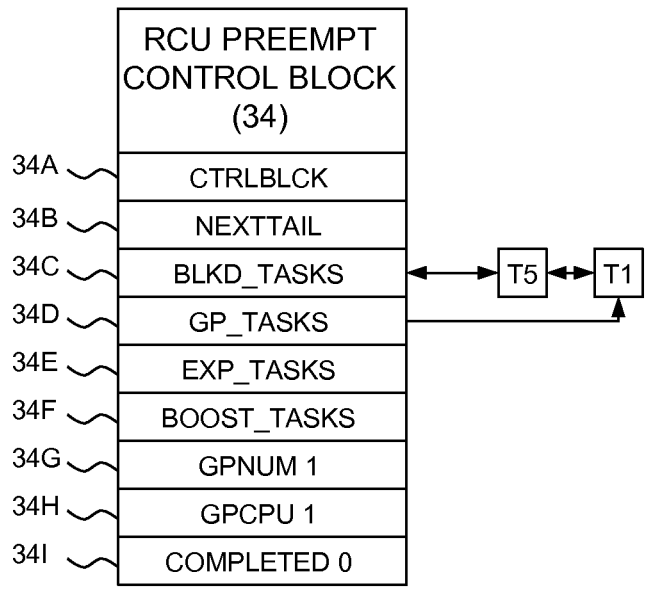
Figure 10J:
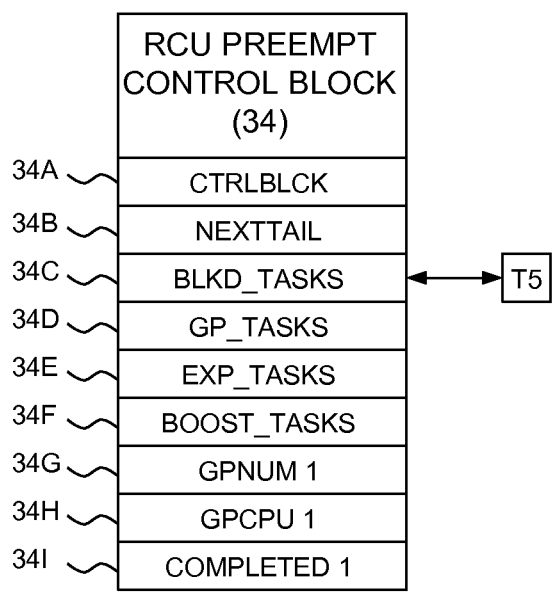
Figure 10K:
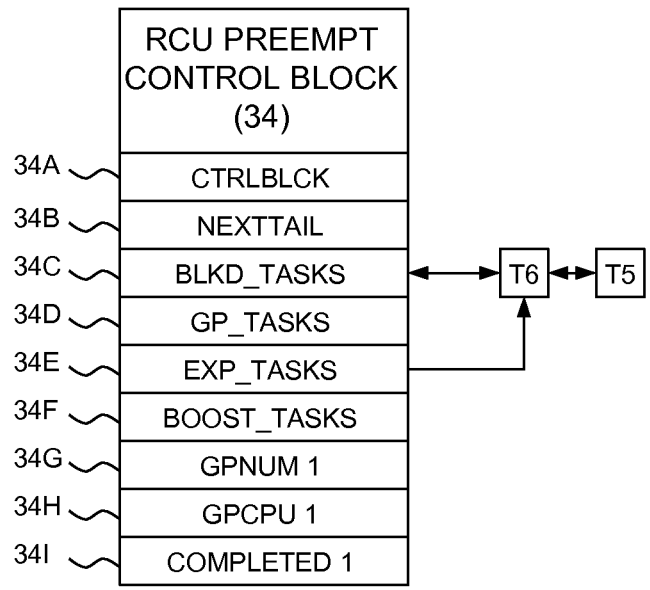
Figure 10L:
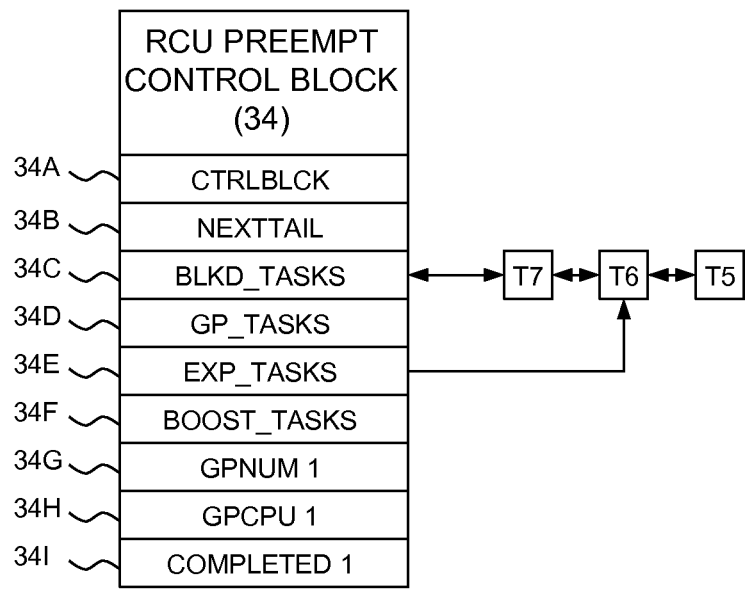
Figure 10M:
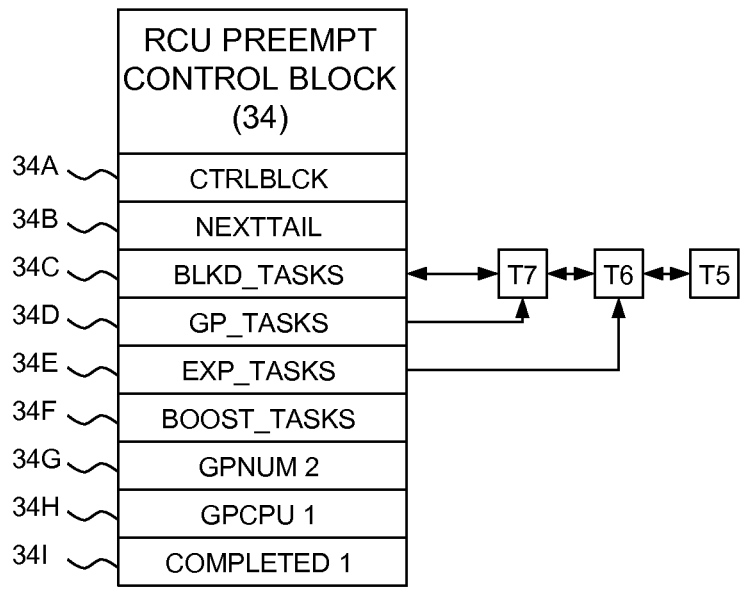
Figure 10N:
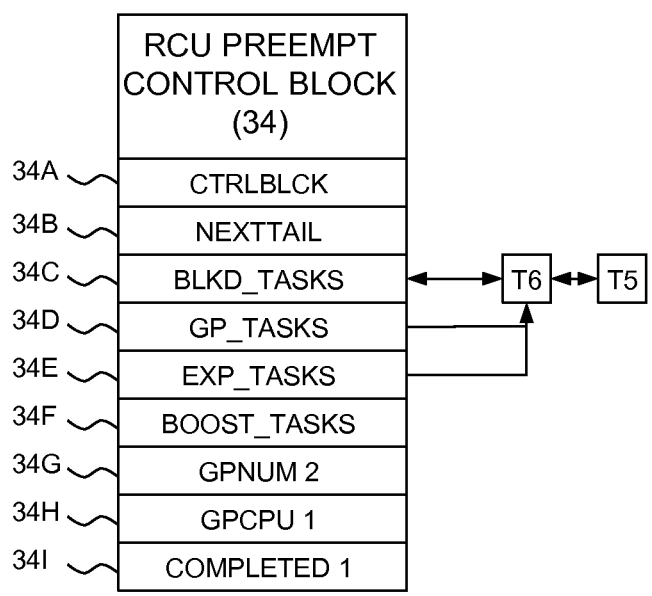
Figure 10O:
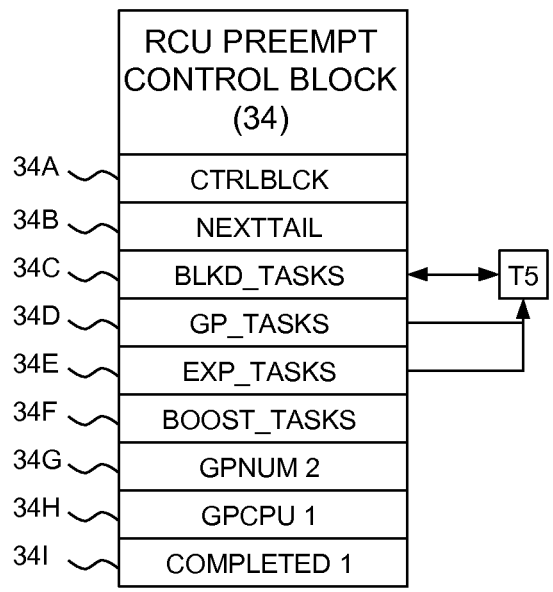

Turning now to FIGS. 10A-10O, an example will now be described to illustrate how the RCU preempt control block 34 may be used to track blocked readers 21 in a uniprocessor embodiment. The use of a single blocked-tasks list is made feasible by virtue of the fact that an expedited RCU grace period typically forces or simulates a context switch on the processor 4, forcing all in-flight RCU read-side critical sections to be preempted. Therefore, after an expedited RCU grace period has forced or simulated a context switch on the processor 4, any subsequent blocked readers cannot possibly be blocking the current expedited RCU grace period. The single blocked-tasks list contains all readers 21 that have blocked within their current RCU read-side critical sections, and this list can be maintained in strict reverse time order. This strict time order in turn means that if any reader 21 is blocking the current asynchronous grace period, all subsequent readers in the blocked-tasks list (which blocked earlier in time) are also blocking the same grace period. Similarly, if any reader 21 is blocking the current expedited grace period, all subsequent tasks in the blocked-tasks list are also blocking the same expedited grace period. Finally, if a given reader 21 needs to be boosted, so do all the readers that follow this reader in the blocked-tasks list. All required state can thus be maintained in the single blocked-tasks list with one pointer each for asynchronous grace period processing (the gp_tasks pointer 34D), expedited grace period processing (the exp_tasks pointer 34E), and boosting (the boost_tasks pointer 34F).

FIG. 10A shows the RCU preempt control block with an empty blocked-tasks list, as it would appear in a completely idle system. As readers 21 are preempted in their RCU read-side critical sections, they are added to the blocked-tasks list. After three such readers 21 have blocked, and assuming a grace period is not in progress, the situation will be as shown in FIG. 10B. The reader tasks are respectively labeled T1, T2 and T3, with the first task T1 being linked to the blkd_tasks list header 34C. If a grace period were to start at this point, the situation would be as shown in FIG. 10C. Here, the gpnum field 34G is set to 1, indicating the start of a new grace period. In addition, the gp_tasks pointer is set to reference the first task T1 in the blocked-tasks list. This is because all three tasks started their RCU read-side critical sections before the current grace period started and thus all of them block the current grace period. The gpcpu field 34H and the completed field 34I remain at 0, indicating that the processor 4 has not responded to the new grace period and the new grace period has not completed.

If task T2 exits its RCU read-side critical section, it removes itself from the blocked-tasks list, resulting in the situation shown in FIG. 10D. As shown in FIG. 10E, if a new task T4 blocks within an RCU read-side critical section at this point, it is added to the head of the blocked-tasks list and the gp_tasks pointer 34D is updated so as to point to the new task. This is due to fact that an end to the current grace period was not previously requested. Such a condition is indicated by the fact that the gpcpu field 34H is less than the gpnum field 34G. However, the addition of new task T4 while a grace period is in progress will trigger a request for an end to the current grace period (assuming no previous request has been made). This request will in turn result in the gpcpu field 34H being being set equal to the gpnum field 34G to acknowledge that the processor has reached a quiescent state and that end-of-grace-period processing is underway. Any subsequent RCU read-side critical section will now be deemed to start subsequent to when the current grace period began. Readers 21 that block within such subsequent RCU read-side critical sections will not prevent the current grace period from ending. Such tasks will be added to the head of the blocked-reader list but the gp_tasks pointer 34D will not be adjusted. An example of this condition is shown in FIG. 10F. Here, task T3 has exited its RCU read-side critical section, and then a new task T5 blocks while in an RCU read-side critical section. Because the gpcpu field 34H is equal to the gpnum field 34G, the RCU subsystem 20 knows that T5's RCU read-side critical section started after the beginning of the current grace period. As such, there is no need to adjust the gp_tasks pointer 34D to point to task T5.

If tasks T4 and T1 remain blocked for too long, then RCU priority boosting might begin. The first action is to point the boost_tasks pointer 34F at the same task referenced by the gp_tasks pointer 34D, as shown in FIG. 10G. Then task T4 is priority boosted and the boost_tasks pointer 34D is advanced to task T1, as shown in FIG. 10H. Because the boost_tasks pointer 34D is moved from one task to the next on the blocked-tasks list, reader boosting can be carried out incrementally, thereby avoiding excessive scheduling latencies. In this particular case, it is not possible for a newly blocked task to block the current grace period (because the gpcpu field 34H is equal to the gpnum field 34G). However, if this were possible, the new task would be boosted immediately upon blocking Alternatively, if the boosting process waits for all processors to pass through a quiescent state before boosting any blocked tasks, then it is never possible for a newly blocked task to block the current grace period once boosting has started, and thus there is never a need to immediately boost a new task upon blocking. Once task T1 is priority boosted, the data-structure layout returns to that shown in FIG. 10F, except that Tasks T4 and T1 are now at a high priority.

In FIG. 10I, task T4 has completed its RCU read-side critical section, removed itself from the blocked-tasks list, and advanced the gp_tasks pointer 34D to point to task T1. Once task T1 completes its RCU read-side critical section, it also removes itself from the blocked-tasks list. Because task T1 was at the tail of the blocked-tasks list, instead of advancing the gp_tasks pointer 34D, it sets the pointer to a NULL value. Because task T1 was the last task blocking the current grace period, the grace period ends and the completed field 34I is set equal to gpnum. This condition is shown in FIG. 10J.

In FIG. 10K, the blocked-tasks list comprises task T5, but then another task T6 enters an RCU read-side critical section. It is further assumed that an updater 18 starts an expedited grace period. This expedited RCU grace period forces a context switch, which places task T6 on the blkd-tasks list, and then sets the exp_tasks pointer 34E to reference T6. This means that both T5 and T6 must finish their current RCU read-side critical sections before the expedited grace period can be permitted to complete. As shown in FIG. 10L, if another task T7 enters an RCU read-side critical section and is preempted, it will be added to the head of the blocked-tasks list. If an asynchronous grace period begins at this point, the gp_tasks pointer 34D will be set to reference task T7 and the gpnum field 34G will be incremented to reflect the start of the new grace period. This condition is shown in FIG. 10M.

Figure 10P:
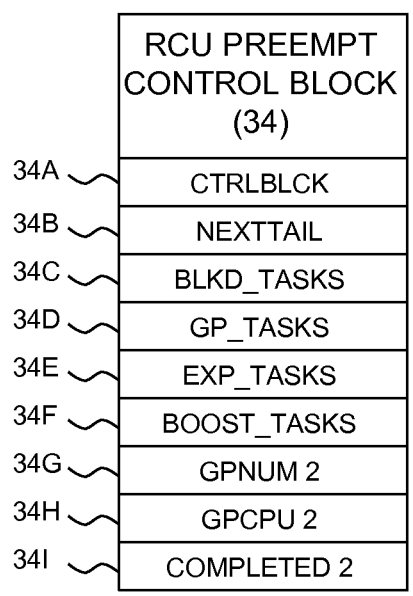

Supposing now that task T7 completes its RCU read-side critical section, it will removes itself from the blocked-tasks list. As shown in FIG. 10N, the gp_tasks pointer 34D will be advanced to the next task in the list, which happens to be task T6. Thus, both the gp_tasks pointer 34D and the exp tasks pointer 34E will now reference task T6. If task T6 now completes its RCU read-side critical section, removing itself from the blocked-tasks list, both of the gp_tasks pointer 34D and the exp_tasks pointer 34E will be updated to reference the next task in the list, namely T5. The result is shown in FIG. 10O. When task T5 completes its RCU read-side critical section, it removes itself from the blocked-tasks list. Because there are no more blocked tasks in the list, the gp_tasks pointer 34D and exp_tasks pointer 34E are set to NULL. This means that both the asynchronous and expedited synchronous grace periods have completed. The gpcpu field 34H and the completed field 34I are set equal to the gpnum field 34G. The result is shown in FIG. 10P.

Figure 11:
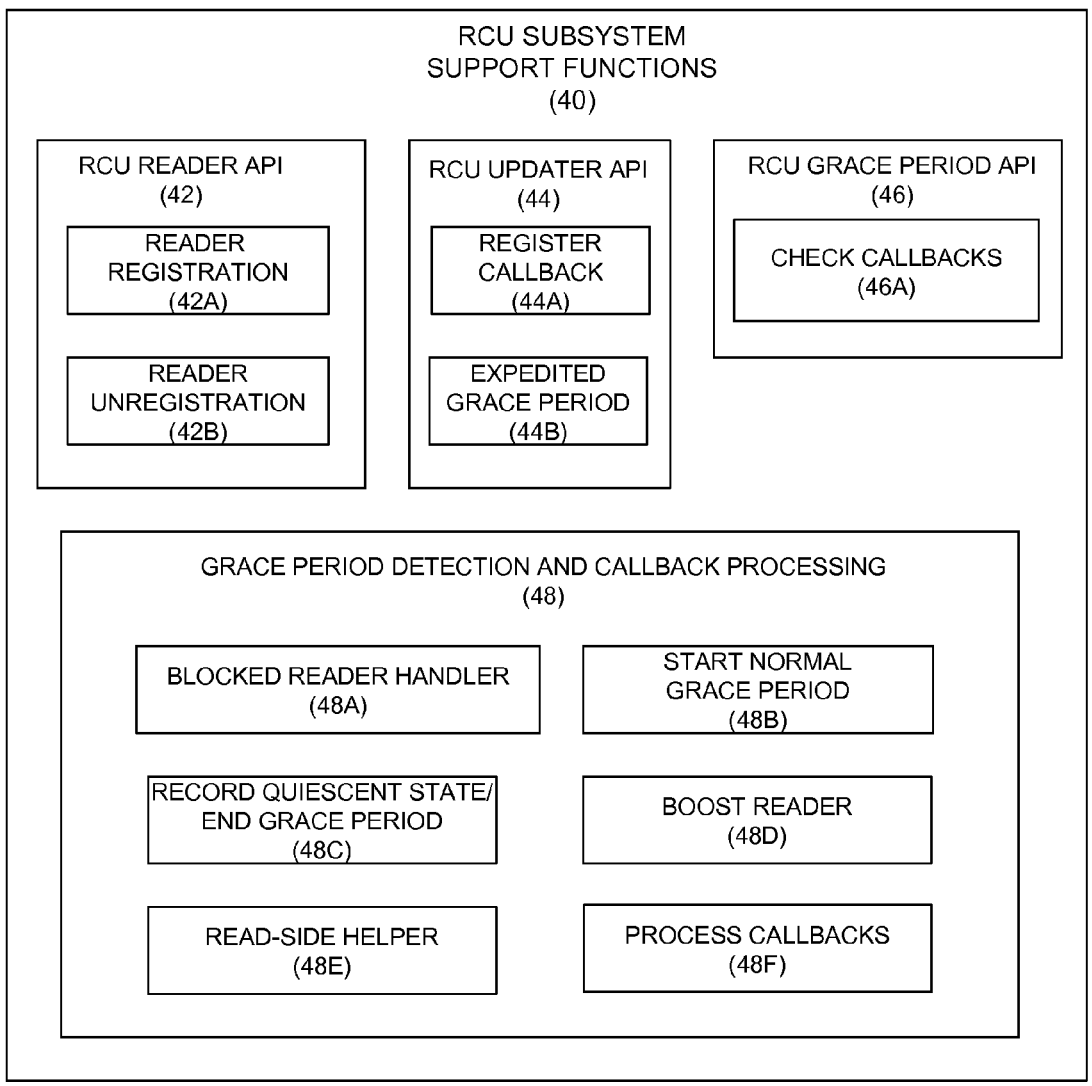
FIG. 11 is a block diagram showing additional functional components of the RCU subsystem of FIG. 6.

Turning now to FIG. 11, further details of the RCU subsystem support functions 40 (briefly introduced above in connection with FIG. 6) will now be described. These functions are common to both the uniprocessor embodiment of FIG. 4 and the multiprocessor embodiment of FIG. 5. The RCU reader API 42 comprises a reader registration component 42A and a reader unregistration component 42B. As described in more detail below, the reader registration component 42A and the reader unregistration component 42B are respectively invoked by readers 21 as they enter and leave their RCU read-side critical sections. These operations allow the RCU subsystem 20 to track reader quiescent states, with all processing performed outside of a set of bounded calls to the reader registration/unregistration components 42A/42B being treated as a quiescent state. The RCU updater API 44 comprises a register callback component 44A and an expedited grace period component 44B. The register callback component 44A is used by updaters 18 to register a callback following a first-phase update to a shared data element 16. A call to the register callback component 44A initiates processing that places the callback on the RCU callback list managed by the RCU control block 32 (see FIG. 7) and starts an asynchronous grace period so that the callback can be processed after the grace period has ended as part of second-phase update processing to remove stale data (or perform other actions). The expedited grace period component 44B is used by updaters 18 to request an expedited grace period following a first-phase update to a shared data element 16. The updater 18 blocks while the expedited grace period is in progress, then performs second-phase update processing to free stale data (or perform other actions). The RCU grace period API 46 comprises a check callbacks component 46A. This component may be run periodically (e.g., in response to a scheduler clock interrupt) in order to check for new callbacks, start a new grace period if one is needed, and request callback processing.

With continuing reference to FIG. 11, the grace period detection and callback processing functions 48 may include a blocked reader handler 48A, a start normal grace period component 48B, a record quiescent state/end grace period component 48C, a boost reader component 48D, a read-side helper component 48E, and a process callbacks component 48F. These functions are common to both the uniprocessor embodiment of FIG. 4 and the multiprocessor embodiment of FIG. 5. However, the multiprocessor embodiment does require certain modifications to the blocked reader handler 48A, as will be discussed in connection with FIGS. 26A-26B.

As described in more detail in the ensuing paragraphs, the blocked reader handler 48A performs responsive actions when a reader 21 is preempted while in its RCU read-side critical section. These actions include adding the preempted reader to the blocked-task list extending from the blkd_tasks list header 34C of the RCU preempt control block 34. The blocked reader handler 48A also manipulates the rcu_read_unlock_special field 36B in the reader's task structure 36. The start normal grace period component 48B is responsible for starting asynchronous grace periods and performing actions such as manipulating the gp_tasks field 34D and the gpnum field 34G of the RCU preempt control block 34. The record quiescent state/end grace period component 48C is responsible for recording quiescent states, ending asynchronous grace periods, and requesting callback processing. This component manipulates the gpnum field 34G and the completed field 34H of the RCU preempt control block 34, and also manipulates the rcu_read_unlock_special field 36B in the reader's task structure 36. The boost reader component 48D is responsible for boosting preempted readers 21 that are delaying the end of a grace period. This component manipulates the boost_tasks field 34F of the RCU preempt control block 34. It also manipulates the rcu_read_unlock_special field 36B in the reader's task structure. The read-side helper component 48E is responsible for removing readers 21 from the blocked-tasks list. The read-side helper also manipulates the gp_tasks pointer 34D, the exp_tasks pointer 34E and the boost_tasks pointer 34F of the RCU preempt control block 34. It also manipulates the rcu_read_unlock_special field 36B in the reader's task structure. The process callbacks component 48F causes callbacks to be processed at the end of a grace period. It may be run in softirq context, by kthread processing, or in any other suitable manner.

Figure 12:
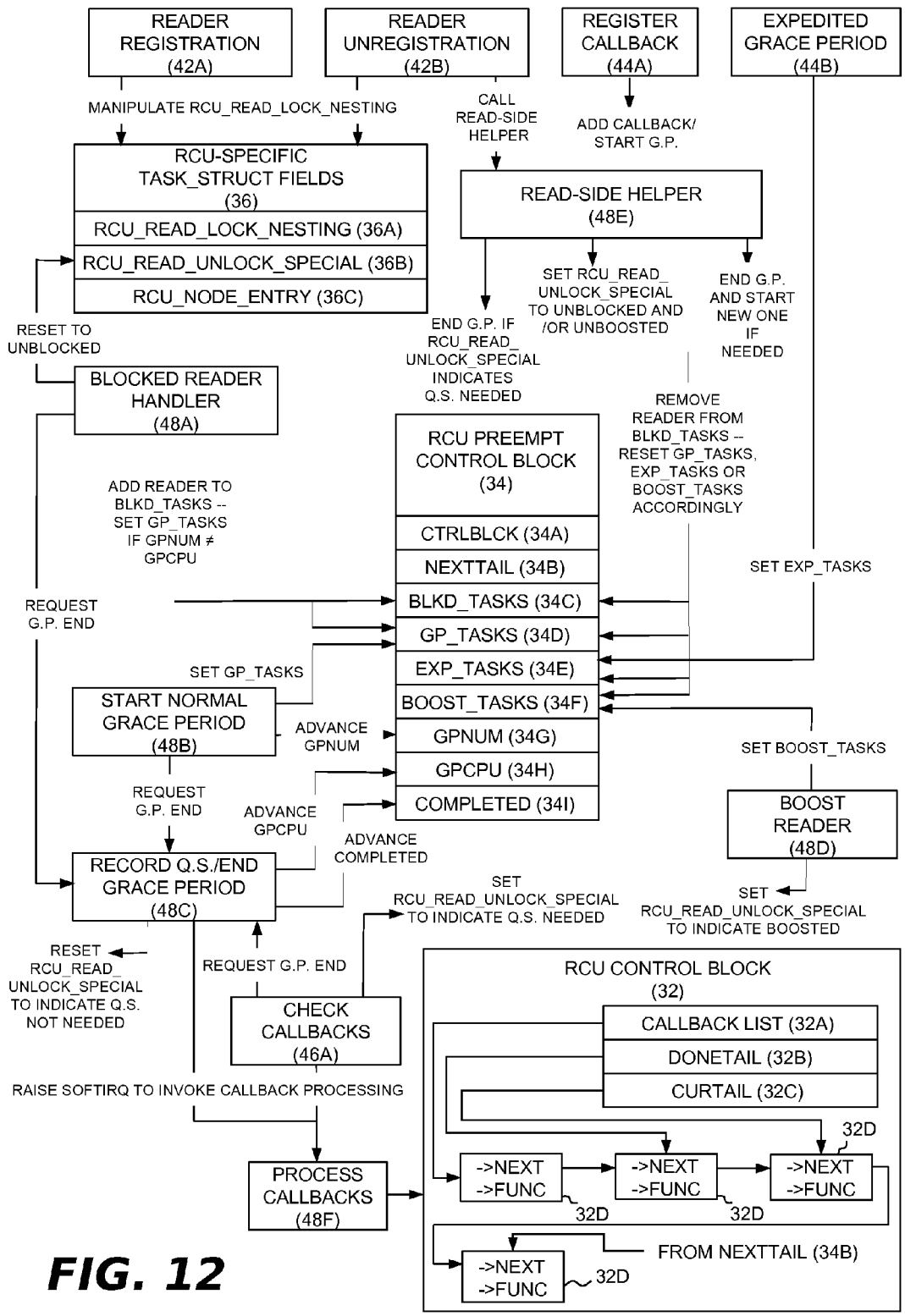
FIG. 12 is a functional block diagram representing a reference map showing operational inter-relationships between the RCU subsystem functional components and data structures shown in FIGS. 6-9 and 11.
Figure 13:
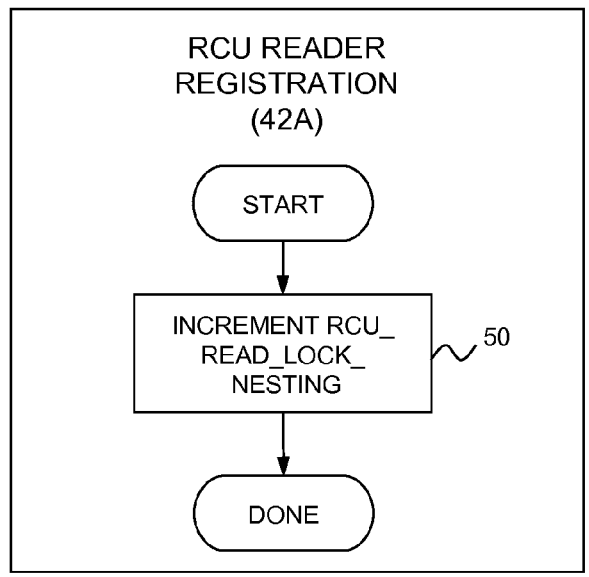
FIG. 13 is a flow diagram illustrating operations that may be performed by an RCU reader registration component of the RCU subsystem.
Figure 14:
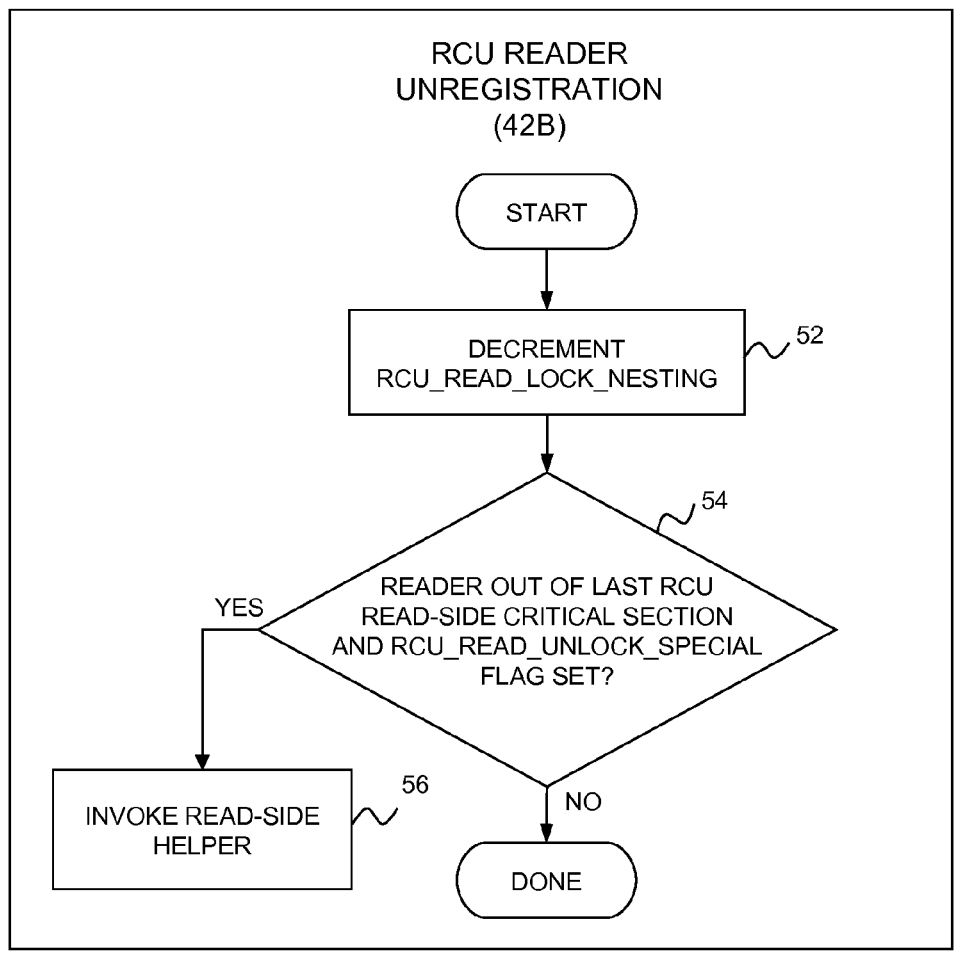
FIG. 14 is a flow diagram illustrating operations that may be performed by an RCU reader unregistration component of the RCU subsystem.

Turning now to FIG. 12, a reference map is shown to illustrate the operational inter-relationships between the various RCU subsystem data structures 30 and support functions 40. The details of FIG. 12 will be discussed in conjunction with the flow diagrams of FIGS. 13-21B, which respectively illustrate example operations of the RCU subsystem support functions 40. Unless otherwise noted, the operations of the various RCU support functions 40 are described in the context of uniprocessor operation. Specific modifications to the blocked reader handler 48A for supporting multiprocessor operation will be discussed in connection with FIGS. 26A-26B below.

The RCU reader registration component 42A is illustrated at the left of the top row of functional components shown in FIG. 12. It is called by readers 21 each time they enter an RCU read-side critical section. In an example embodiment, a function name such as "rcu_read_lock( )" may be used when coding the RCU reader registration component 42A in software. With additional reference now to FIG. 13, the sole operation of the RCU reader registration component 42A is to non-atomically increment the rcu_read_lock_nesting field 36A of the reader's task structure 36, as shown in block 50. It will be seen that there are no locks, atomic instructions, memory barriers or disabling of interrupts or preemption. At most, a compiler directive may be needed prior to block 50 to prevent a compiler from undertaking code-motion optimizations that would move any code following the call to the RCU reader registration component 42A outside of the RCU read-side critical section. The Linux® kernel barrier( ) directive is an example.

The RCU reader unregistration component 42B is illustrated next to the RCU reader registration component 42A in the top row of functional components shown in FIG. 12. It is called by readers 21 each time they leave an RCU read-side critical section. In an example embodiment, a function name such as "rcu_read_unlock( )" may be used when coding the RCU reader unregistration component 42B in software. With additional reference now to FIG. 14, the RCU reader unregistration component 42B implements block 52 in which it non-atomically decrements the rcu_read_lock_nesting field 36A of the reader's task structure 36 that was incremented in block 50 of FIG. 13. In block 54, a compound test is made to determine if the reader has exited its outermost critical section (i.e., the rcu_read_lock_nesting field 36A has decremented to zero) and if a flag has been set in the rcu_read_lock_special field 36B of the reader's task structure 36. This could be any one of the RCU_READ_UNLOCK_BLOCKED flag, the RCU_READ_UNLOCK_NEED_QS flag or the RCU_READ_UNLOCK_BOOSTED flag. If the condition checked for in block 54 is present, the reader 21 requires special handling due to the reader having been preempted. Processing proceeds to block 56 and the read-side helper 48E is invoked. The operations of the read-side helper 48E are discussed in more detail below in connection with FIGS. 23A-23B. If it is determined in block 54 that the rcu_read_lock_nesting field 36A is not zero, or if a flag is not set in the rcu_read_lock_special field 36B, the RCU reader registration component 42B returns. A non-zero value of the rcu_read_lock_nesting field 36A means that the reader 21 is ending a nested RCU read-side operation and no further read-side action is required other than the decrement of block 52. The condition wherein no flag is set in the rcu_read_lock_special field 36B also means that no further read-side action is required. It will be seen that there are no locks, atomic instructions, memory barriers or disabling of interrupts or preemption. At most, a compiler directive may be needed prior to block 52 to prevent a compiler from undertaking code-motion optimizations that would move any code prior to the call to the RCU reader unregistration component 24 outside of the RCU read-side critical section.

The blocked reader handler 48A is illustrated on the left-hand side of FIG. 12, immediately below the RCU-specific task structure 36. In an example embodiment, a function name such as "rcu_$_{preempt}$_note_context_switch( )" may be used when coding the blocked reader handler 48A in software. This component is called by the context switch code of the operating system scheduler early in the context switch process. With additional reference now to FIG. 15, the blocked reader handler 48A implements block 60 to disable interrupts and then block 62 to check the condition of the outgoing reader 21. In particular, the reader's task structure 36 is checked and a determination is made whether the rcu_read_lock_nesting field 36A is incremented (e.g., greater than zero), indicating that the reader is about to be blocked inside an RCU critical section. Block 62 also checks whether the RCU_READ_UNLOCK_BLOCKED flag in the rcu_read_unlock_special field 36B has not yet been set. If the rcu_read_lock_nesting field 36A is not incremented, or if the READ_UNLOCK_BLOCKED flag is already set, the blocked reader handler 28A proceeds to block 72 and invokes the record quiescent state/end grace period component 48C to record a quiescent state. On the other hand, if the conditions of block 62 are met, block 64 sets the reader's READ_UNLOCK_BLOCKED flag to arrange for the read-side helper 48E to take action when the reader 21 ultimately completes its RCU read-side critical section. Block 66 adds the reader 21 to the beginning of the blocked-tasks list. In block 68, the RCU preempt control block 34 is checked and a determination is made whether the gpcpu field 34H equals the gpnum field 34G, indicating that the processor 4 has acknowledged the current grace period (and is therefore in a quiescent state). If it has, processing proceeds to block 72 and the record quiescent state/end grace period component 48C is invoked in order to end the current grace period. If the processor 4 has not yet acknowledged the current grace period, block 70 is implemented and the gp_tasks pointer 34D in the RCU preempt control block 34 is set to reference the reader 21 on the blocked-tasks list. Processing then proceeds from block 70 to block 72 so that the record quiescent state/end grace period component 48C can be invoked to record a quiescent state and end the current grace period. Finally, block 74 restores interrupts.

The record quiescent state/end grace period component 48C is illustrated on the lower left-hand side of FIG. 12. In an example embodiment, a function name such as "rcu_preempt_cpu_qs( )" may be used when coding the record quiescent state/end grace period component 48C in software. As noted in the paragraph above, this component is called by the blocked reader handler 48A to record processor quiescent states and end grace periods. As described in more detail in subsequent paragraphs below, the record quiescent state/end grace period component 48C is also called by the start normal grace period component 48B, the check callbacks component 46A, and the read-side helper 48E. It records a quiescent state for the processor 4 (and for the current reader), attempts to end the current grace period if it is possible to do so (i.e., if there are no blocked readers), and then initiates callback processing if there are any eligible callbacks.

Figure 16:
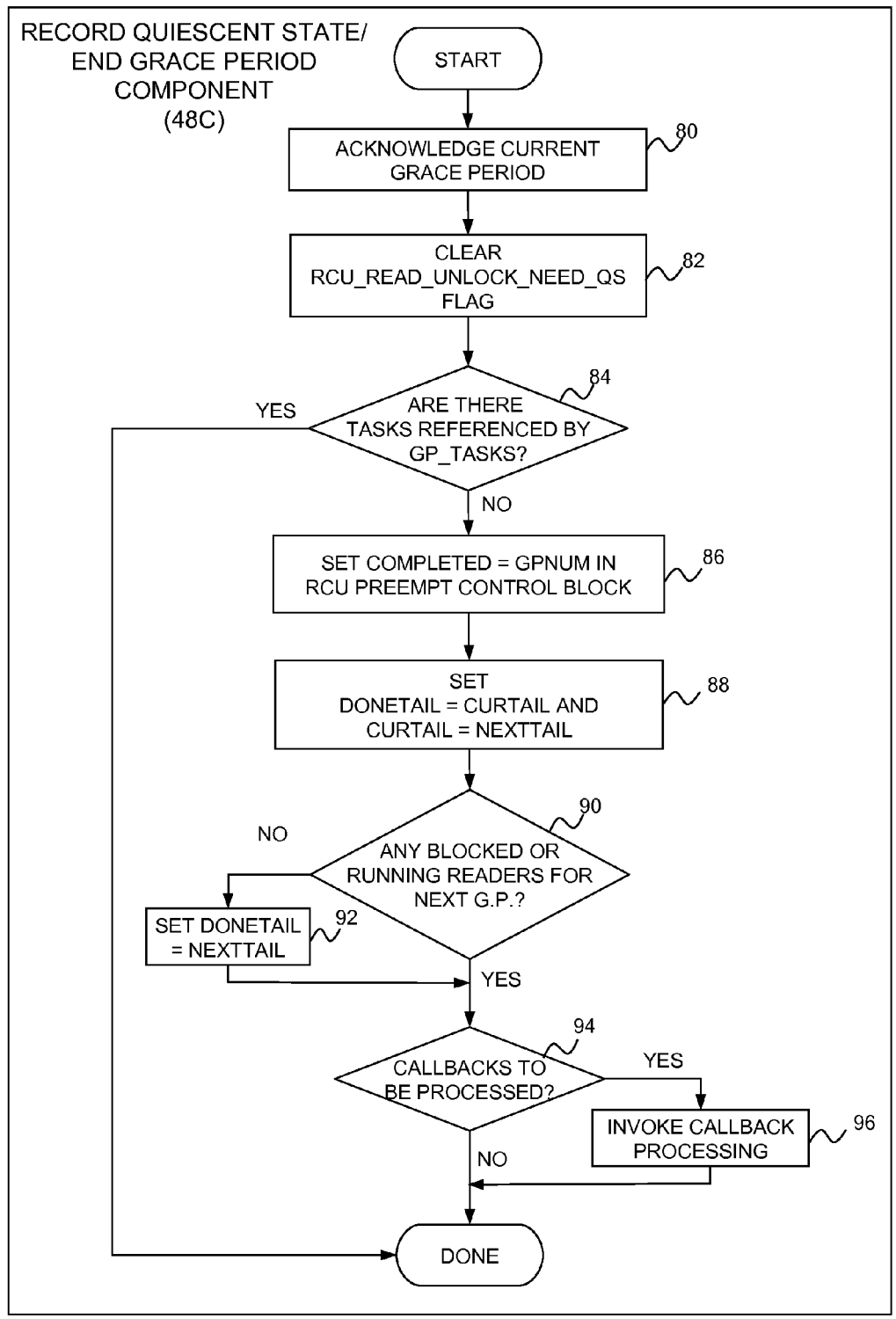
FIG. 16 is a flow diagram illustrating operations that may be performed by a record quiescent state/end grace period component of the RCU subsystem.

With additional reference now to FIG. 16, the record quiescent state/end grace period component 48C implements blocks 80 and 82 to record that both the processor 4 and the current reader 21 have acknowledged the current grace period (thereby indicating that they have reached a quiescent state). In block 80, the gpcpu field 34H is set equal to the gpnum field 34G in the RCU preempt control block 34 to show that the processor 4 has acknowledged the current grace period. In block 82, the RCU_READ_UNLOCK_NEED_QS flag is cleared in the reader's task structure 36 to show that the reader 21 has acknowledged the current grace period. Block 84 checks whether there are any tasks referenced by the gp_tasks pointer 34D in the RCU preempt control block 34. If there are, the current grace period cannot be ended and the record quiescent state/end grace period component 48C returns without performing any further processing. If there are no tasks holding up the current grace period, block 86 marks the end of the grace period by setting the completed field 34I equal to the gpnum field 34G in the RCU preempt control block 34. Block 88 advances the pending callbacks (if any) for callback processing, setting the donetail pointer 32B equal to the curtail pointer 32C in the RCU control block 32, and the setting the curtail pointer 32C equal to the nexttail pointer 34B in the RCU preempt control block 34. In block 90, a check is made whether there are any further blocked readers in the blocked-tasks list or any running readers. If not, this means that the next grace period (the one following the current grace period) can also be ended, and any callbacks associated with that grace period may also be advanced for callback processing. Block 92 performs the callback advancement by setting the donetail pointer 32B equal to the RCU nexttail pointer 34B. Following block 92, or if block 90 determines that the next grace period cannot yet be ended, block 94 checks whether there are any callbacks on the donelist that need to be processed. If there are, callback processing is initiated in block 96 (e.g., by performing actions that invoke the process callbacks component 48F).

The start normal grace period component 48B is illustrated on the left-hand side of FIG. 12, immediately above the record quiescent state/end grace period component 48C. In an example embodiment, a function name such as "rcu_preempt_start_gp( )" may be used when coding the start normal grace period component 48B in software. This component is called by the register callback component 44A when an updater 18 registers a new callback, and by the read-side helper 48E when a reader 21 is leaving its outermost RCU read-side critical section after having been preempted during the critical section. It is run with interrupts disabled and starts a new asynchronous grace period if one is warranted.

Figure 17:
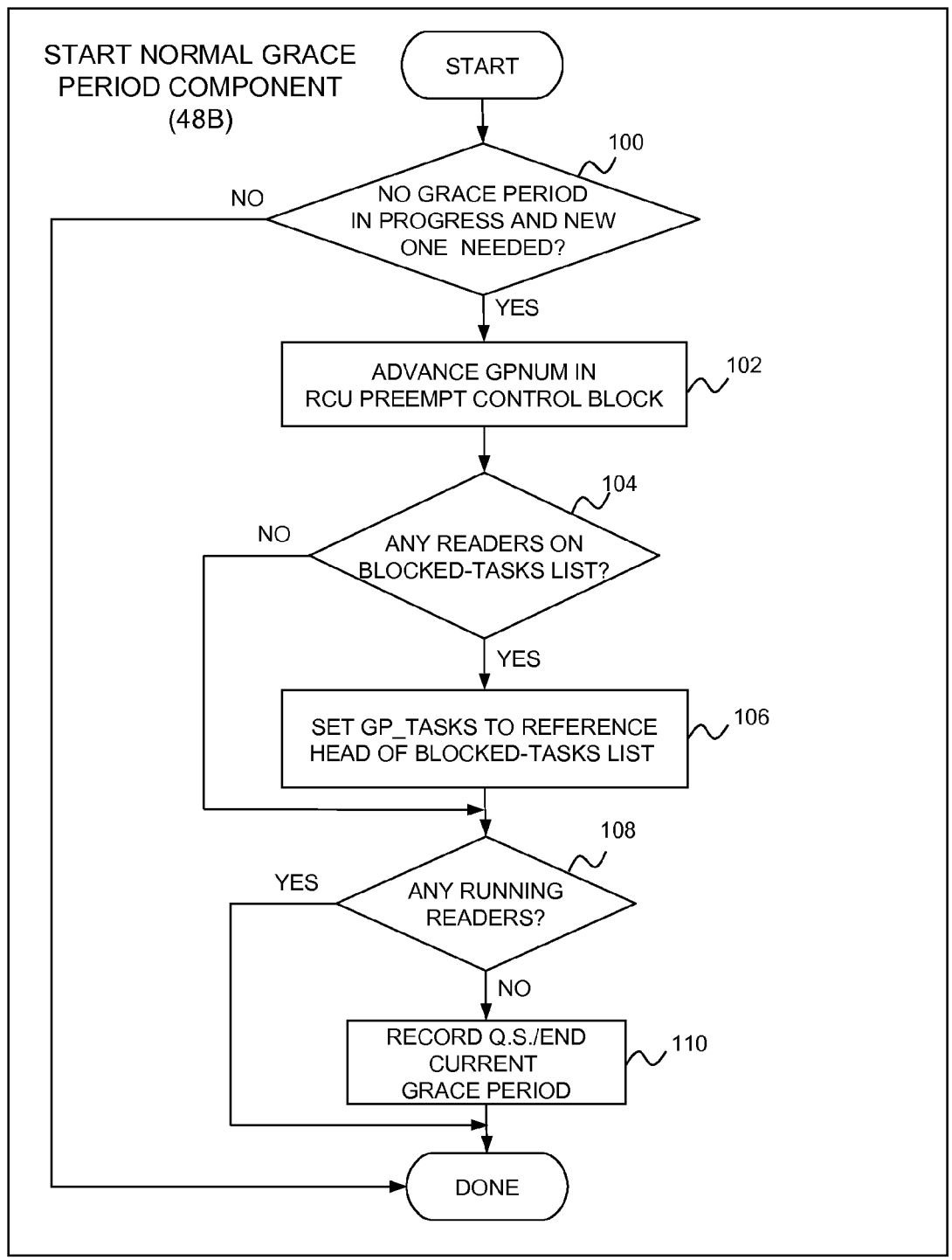
FIG. 17 is a flow diagram illustrating operations that may be performed by a start normal grace period component of the RCU subsystem.

With additional reference now to FIG. 17, the start normal grace period component 48B implements block 100 to determine whether a new grace period should be started. A new grace period will be started only if there is no current grace period in progress and if a new grace period is needed (e.g., due to callbacks being present on the curlist). Otherwise, the start normal grace period component 48B returns. If a new grace period is needed, block 102 is implemented and the gpnum field 34G is advanced in the RCU preempt control block 34 to officially start the new grace period. In block 104, a check of the blocked-tasks list is made to determine if there are any blocked readers 21. If there are no blocked readers 21 on the blocked tasks list, processing moves to block 108. If there are blocked readers 21, block 106 sets the gp_tasks pointer 34D in the RCU preempt control block 34 to reference the first task on the list. In block 108, a check is made to determine if there are any readers 21 that are currently running within an RCU read-side critical section. This condition may arise if the start normal grace period component 48B is executed in interrupt context while there is a running reader (e.g., due to an interrupt handler executing the register callback component 44A). If there is a running reader 21, the start normal grace period component 48B returns. If there are no such readers, block 110 implements a call to the record quiescent state/end grace period component 48C to record a quiescent state and end the current grace period.

The check callbacks component 46A is illustrated on the bottom left-hand side of FIG. 12, immediately below and to the right of the record quiescent state/end grace period component 48C. In an example embodiment, a function name such as "rcu_preempt_check_callbacks( )" may be used when coding the check callbacks component 46A in software. This component is called by the scheduling clock interrupt handler of the operating system and is run with interrupts disabled. It checks for eligible callbacks and invokes callback processing if a grace period has ended. If a grace period is in progress and there is a current reader 21 running on the processor 4, it advises the reader that a quiescent state is needed.

Figure 18:
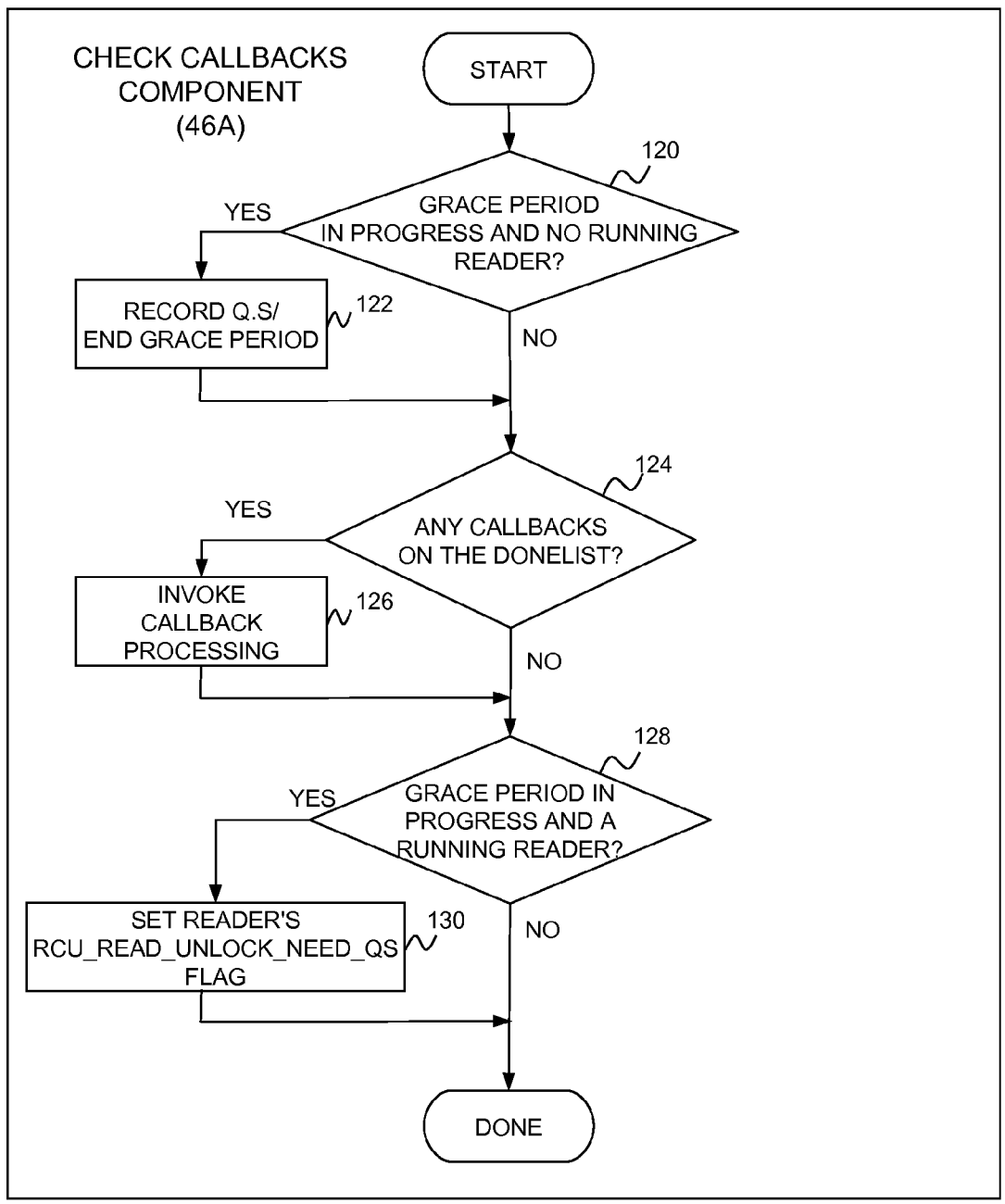
FIG. 18 is a flow diagram illustrating operations that may be performed by a check callbacks component of the RCU subsystem.

With additional reference now to FIG. 18, the check callbacks component 46A implements block 120 to check whether the current grace period should end. The current grace period will end only if there a current grace period in progress and if no reader 21 is currently running within an RCU read-side critical section. If both conditions are satisfied, block 122 implements a call to the record quiescent state/end grace period component 48C to record a quiescent state and end the current grace period. Moreover, as previously mentioned, the record quiescent state/end grace period component 48C advances callbacks on the callback lists. Following block 122, or if the conditions for implementing block 122 were not satisfied, block 124 checks whether there are any callbacks from a previously completed grace period that are ripe for processing. This is determined by checking for callbacks on the donelist. If there are such callbacks, callback processing is initiated in block 126 (e.g., by performing actions that invoke the process callbacks component 48F). Following callback processing, or if block 124 determines that there are no callbacks on the donelist, block 128 checks if there is a grace period in progress and if the current task (i.e., the one that was interrupted by the scheduling clock interrupt that invoked the check callbacks component 46A) is a reader 21 currently running inside an RCU read-side critical section. If both conditions are satisfied, the RCU_READ_UNLOCK_NEED_QS flag is set in the rcu_read_unlock_special field 36B of the reader's task structure 36. As previously mentioned, this flag is set in order to advise the RCU subsystem 20 that the reader 21 needs it to pass through a quiescent state before the current grace period can end.

The process callbacks component 48F is illustrated at the bottom left-hand side of FIG. 12, immediately below the check callbacks component 46A. In an example embodiment, a function name such as "_rcu_process_callbacks( )" may be used when coding the process callbacks component 48F in software. As mentioned in the paragraph above, this component is invoked when the check callbacks component 46A detects that there are callbacks on the donelist that require processing. In an example embodiment, the process callbacks component 48F may be invoked in a deferred manner, such as in a bottom-half context of the operating system. One example would be to run the process callbacks component 48F as a softirq, a tasklet, etc. Processing within a kthread may also be used if such functionality is provided by the operating system (e.g., as is it in current versions of the Linux® kernel). This component runs with interrupts disabled. It identifies callbacks that are ripe for processing on the donelist and curlist portions of the RCU callback list, and manipulates the RCU callback list pointer 32A, the donetail pointer 32B and the curtail pointer 32C. An additional function, which may be named "rcu_preempt_remove_callbacks( )" may also be invoked if conditions warrant processing of the nextlist portion of the RCU callback list.

Figure 19:
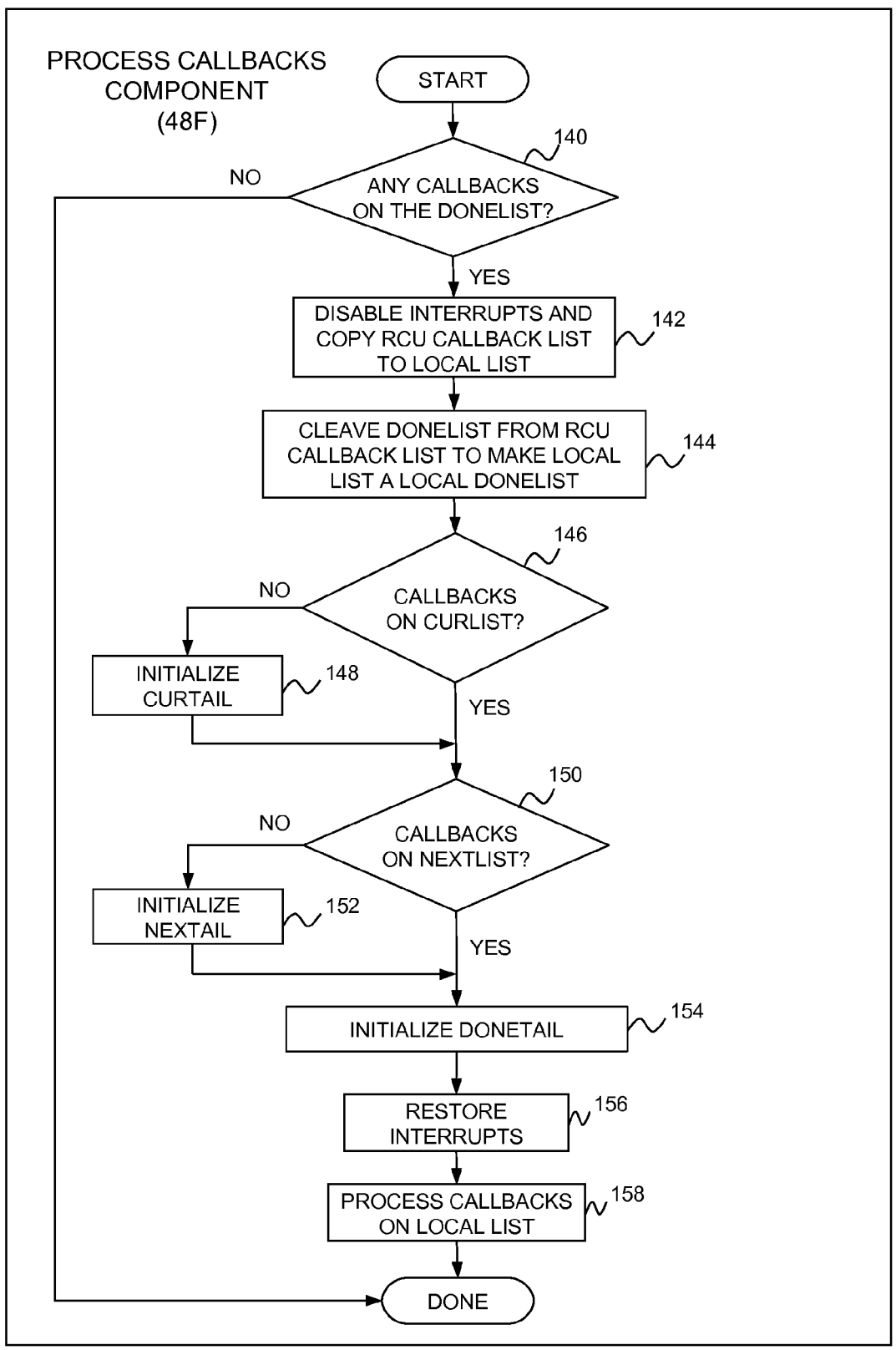
FIG. 19 is a flow diagram illustrating operations that may be performed by a process callbacks component of the RCU subsystem.
Figure 20:
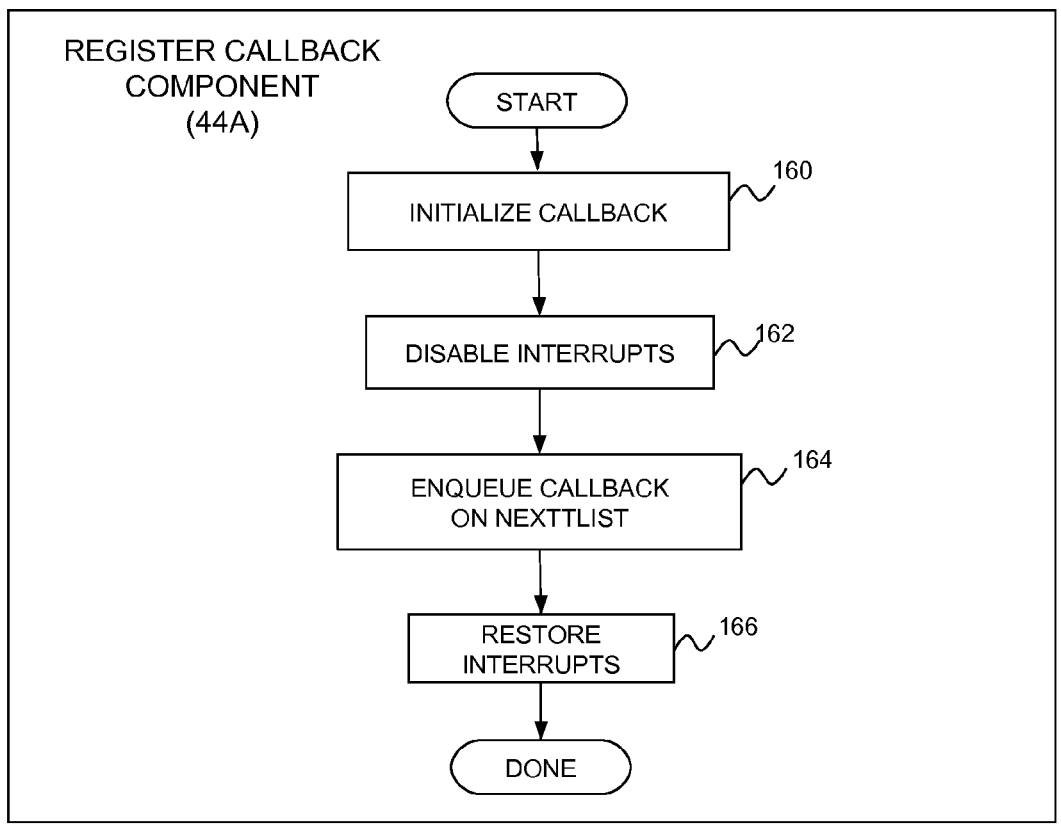
FIG. 20 is a flow diagram illustrating operations that may be performed by a register callback component of the RCU subsystem.
Figure 21:
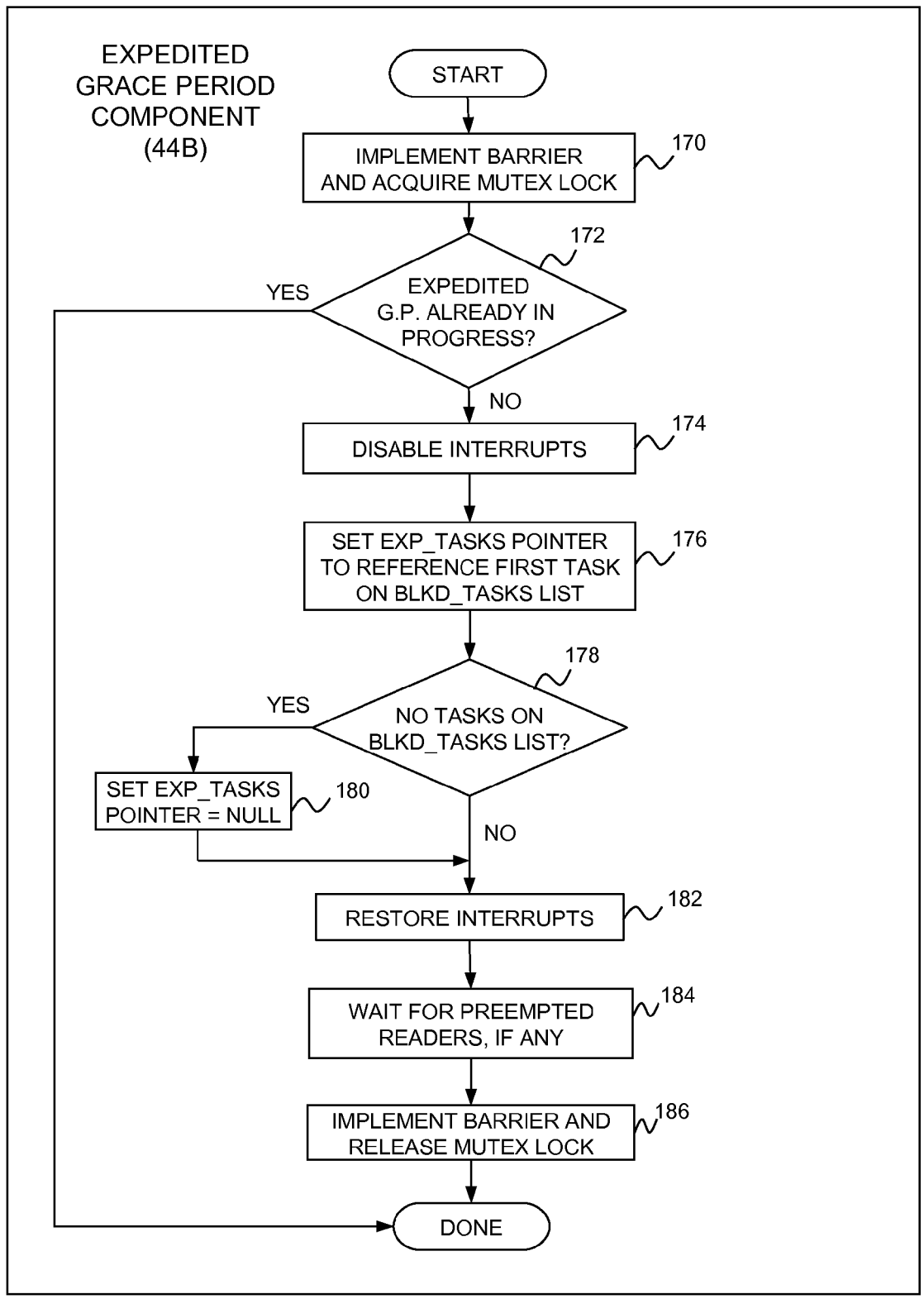
FIG. 21 is a flow diagram illustrating operations that may be performed by an expedited grace period component of the RCU subsystem.

With additional reference now to FIG. 19, the process callbacks component 46A implements block 140 to check for callbacks on the donelist portion of the RCU callback list. If block 140 determines that there are such callbacks, block 142 disables interrupts and copies the RCU callback list head pointer 32A to a temporary local list pointer, effectively creating a local callback list. Block 144 cleaves the donelist portion of the RCU callback list from the remainder of the list (e.g., by pointing the RCU callback list head pointer 32A to the start of curlist). Block 144 also NULLs the pointer of the last callback on the donelist, such that the local callback list created in block 142 now represents a fully intact, isolated donelist that is in proper condition for callback processing. In block 146, a check is made for callbacks on the curlist. If there are none, block 148 initializes the RCU curtail pointer 32C. In block 150, a check is made for callbacks on the nextlist. If there are none, block 152 initializes the RCU nexttail pointer 34B. Block 154 initializes the RCU donetail pointer 32B. As previously discussed, the foregoing initializations may be performed by pointing the RCU curtail pointer 32C, the RCU nexttail pointer 34B and the RCU donetail pointer 32B to point to the RCU callback list head pointer 32A. Block 156 restores interrupts. Block 158 processes the callbacks one the local donelist using a conventional RCU callback processing technique.

The register callback component 44A is illustrated next to the reader unregistration component 42B in the top row of functional components shown in FIG. 12. In an example embodiment, a function name such as "call_rcu( )" may be used when coding the register callback 44A in software. This component is invoked by updaters 18. Its purpose is to register a callback for subsequent processing following a corresponding grace period by placing them on the RCU callback list. With additional reference now to FIG. 20, the register callback component 44A implements block 160 to initialize the callback (including its ->next pointer). Block 162 disables interrupts. Block 164 enqueues the new callback at the tail of the nextlist portion of the RCU callback list. This may be done by setting the ->next pointer of the existing callback at the end of nextlist to point to the new callback, and by setting the RCU nexttail pointer 34B in the RCU preempt control block 34 to point to the new callback's ->next pointer. Following callback registration, block 166 restores interrupts.

The expedited grace period component 44B is illustrated next to the reader register callback component 44A in the top row of functional components shown in FIG. 12. In an example embodiment, a function name such as "synchronize_rcu_expedited( )" may be used when coding the expedited grace period component 44B in software. This component is invoked by updaters 18. Its purpose is to force an expedited grace period following an update while the updater 18 blocks on a wait queue. With additional reference now to FIG. 21, the expedited grace period component 44B implements block 170 to execute a barrier instruction and then acquires a mutex lock that prevents other updaters 18 from running this component at the same time. Block 172 checks to see if an expedited grace period is already in progress, and exits if there is one. Block 174 disables interrupts and block 176 sets the exp_tasks pointer 34E in the RCU preempt control block 34 to point to the first task on the blocked-tasks list. If block 178 finds that there are no blocked tasks, the exp_task pointer 34E is set to NULL. If there blocked tasks, block 182 restores interrupts, block 184 waits for any blocked readers, if there are any, and block 186 implements a barrier and releases the mutex lock that was acquired in block 170.

The boost reader component 48D is illustrated near the middle right-hand side of FIG. 12, immediately above the RCU control block 32. In an example embodiment, a function name such as "start_boost( )" may be used when coding the boost reader component 48D in software. This component may be invoked by the record quiescent state/end grace period component 48C, by the expedited grace period component 44B, or by some other component of the RCU subsystem 20 if it is determined that one or more readers 21 are blocked for too long. What constitutes a reader 21 blocking for "too long" may be judged by various criteria, such as the duration of the RCU read-side critical section, the number of callbacks waiting for the current grace period to complete, the amount of memory waiting for the current grace period to complete, a combination of the foregoing, or based on other criteria. The purpose of the boost reader component 48D is to boost the priority of such readers so that they can leave their RCU read-side critical section and allow a grace period to be completed.

Figure 22:
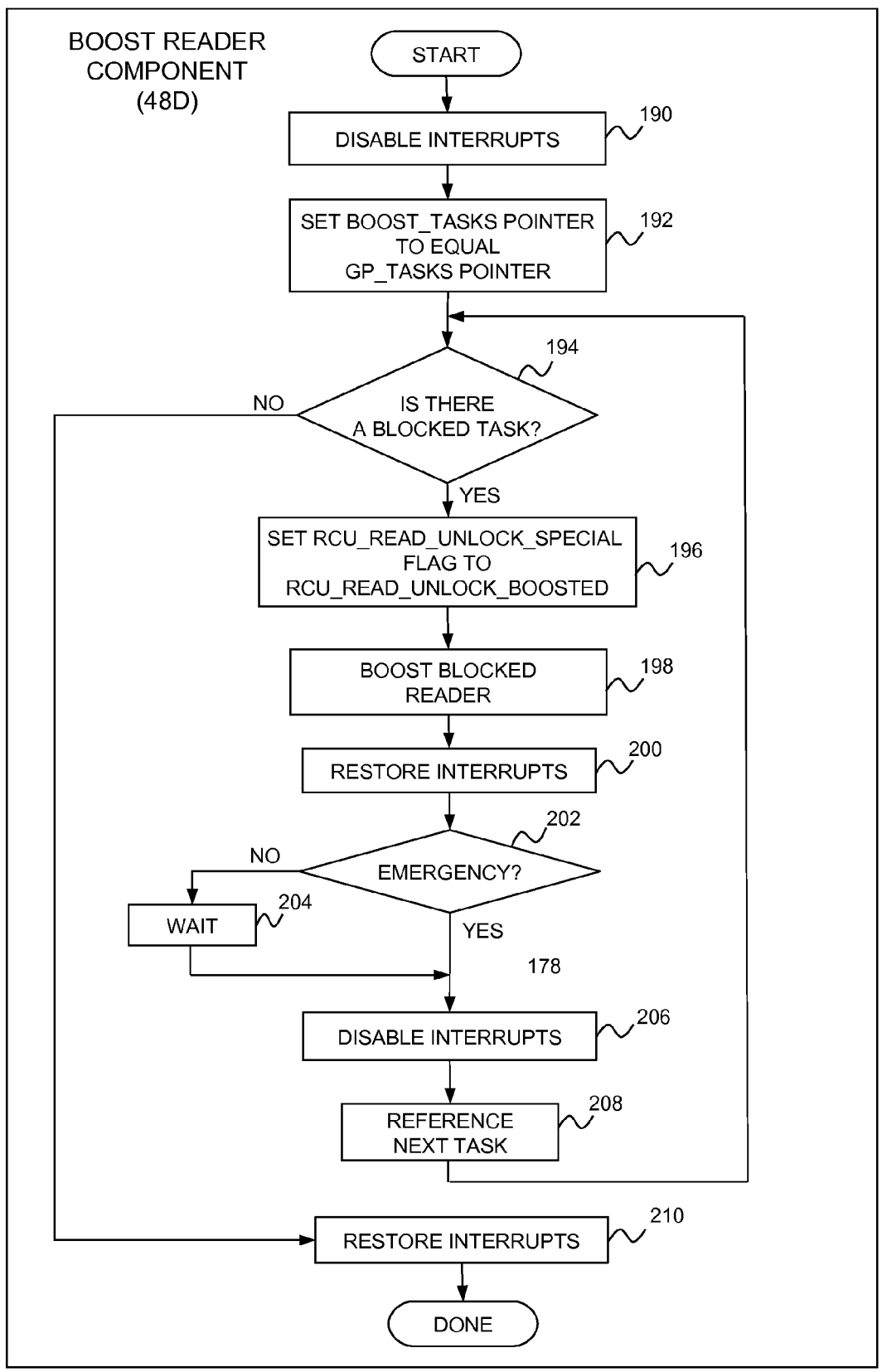
FIG. 22 is a flow diagram illustrating operations that may be performed by a boost reader component of the RCU subsystem.

With additional reference now to FIG. 22, the boost reader component 48D implements block 190 to disable interrupts and then block 192 to set the boost_tasks pointer 34F equal to the gp_tasks pointer 34D in the RCU preempt control block 34. This points the boost_tasks pointer 34F to the first blocked reader on the blocked-tasks list that is blocking the current grace period. Blocks 194-208 represent a loop in which one blocked reader is priority-boosted on each pass through the loop. Block 194 causes an exit if there is no blocked reader task. If there is a blocked reader, block 196 sets the RCU_READ_UNLOCK_BLOCKED flag in the readers rcu_read_unlock_special task structure field 36B. Block 198 boosts the reader's priority (using any suitable technique) to a desired increased priority level, the exact value of which is a matter of design choice. Block 200 restores interrupts and block 202 checks if the boosting was provoked by an emergency condition. An example of an emergency condition would be where the system's memory is danger of dropping too low to continue normal operation. The purpose of this check is to prevent large numbers of boosted readers from consuming all available processor time if there is no emergency. If an emergency condition is not detected, block 204 causes the boost reader component 48D to block for a short time period, for example, by waiting until all tasks that have been boosted to exit their RCU read-side critical sections (or by waiting for a fixed length of time). Following this blocking period, or if an emergency was detected in block 202, block 208 advances the boost_tasks pointer 34F to reference the next reader task on the blocked-tasks list. This completes the loop and processing returns to block 194. The foregoing loop is performed until the end of the blocked-tasks list is reached. At that point, the "No" path is taken out of block 194 and interrupts are restored in block 210.

If desired, the boost reader component 48D may be implemented in alternative ways. For example, instead of a loop, this function could rely on code in the scheduling-clock interrupt handler of the operating system to boost individual readers 21 that are preempted within an RCU read-side critical section. The function could also take the precaution of boosting itself to ensure that it is not preempted by the boosted tasks. The function could also boost all blocked tasks, not just the ones blocking the current grace period. The function could also record a priority indicator in the RCU preempt control block 34. This indicator could then be used to immediately boost subsequent readers 21 upon being preempted. The function could also continue boosting tasks until some criterion was met, for example, some amount of memory being freed by RCU callbacks. The function could also boost the priority of the callback processing code (e.g., a softirq thread), thus enabling the callbacks to execute despite a looping realtime thread.

The read-side helper 48E is illustrated at the upper portion of FIG. 12, below the reader unregistration component 42B. In an example embodiment, a function name such as "rcu_read_unlock_special( )" may be used when coding the read-side helper 48E in software. This component is invoked by the reader unregistration component 42B when a reader 21 is exiting its outermost RCU read-side critical section and detects that a flag has been set in its rcu_read_lock_special field 36B (see block 54 of FIG. 14).

Figure 23A:
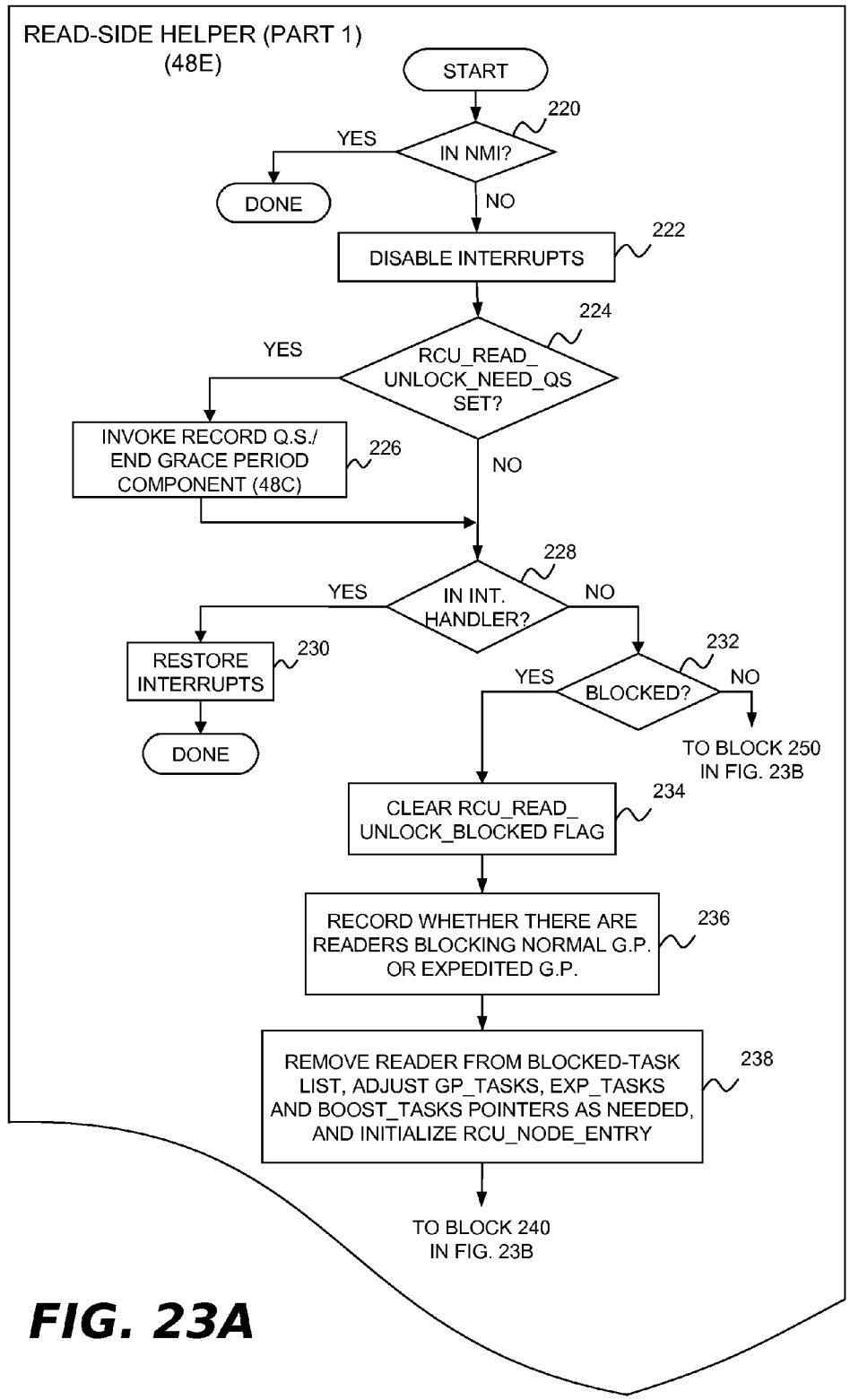
FIG. 23A is a first part of a flow diagram illustrating operations that may be performed by a read-side helper of the RCU subsystem.

With additional reference now to FIG. 23A, the read-side helper 48E implements block 220 and returns if it was called from within an NMI (Non-Maskable Interrupt) handler. NMI handler code is typically allowed to contain RCU read-side critical sections. However, NMI handlers cannot be interrupted and thus do not require the services of the read-side helper 48E, which deals with reader blocking Being non-interruptible, NMI handlers should never block within an RCU read-side critical section. In block 222, the read-side helper component 48E disables interrupts, which prevents scheduling clock interrupt code from running (either due to an interrupt or due to preemption). Block 224 checks the rcu_read_unlock_special field 36B in the reader's task structure 36 and determines whether the RCU_READ_UNLOCK_NEED_QS flag is set. If so, block 226 invokes the record quiescent state/end grace period component 48C to clear the flag and record a processor quiescent state. Following block 226, or if block 222 found that the RCU_READ_UNLOCK_NEED_QS flag is not not, processing reaches block 228. Blocks 228 and 230 cause the read-side helper 28E to restore interrupts and return if it was called from within an interrupt handler. Interrupt handlers cannot block (see block 234, discussed below) so there is nothing more to do in that case. If the read-side helper 48E is not in an interrupt handler, block 232 checks the rcu_read_unlock_special field 36B in the reader's task structure 36 to determine if the RCU_READ_UNLOCK_BLOCKED flag is set. If it is, processing proceeds to block 234. If not, processing proceeds to block 250 of FIG. 23B.

Block 234 clears the RCU_READ_UNLOCK_BLOCKED flag, thus marking the reader 21 as no longer being blocked within an RCU read-sided critical section. Block 236 checks the RCU preempt control block 34 and records whether there are readers blocking an asynchronous grace period and/or an expedited grace period. Block 238 removes the reader 21 from the blocked-tasks list. Block 238 also checks whether the reader 21 was the first blocked task that was blocking the current asynchronous grace period, and/or was the first blocked task that was blocking the current expedited grace period, and/or was the first blocked task being boosted. If so, block 238 adjusts one or more of the gp_tasks pointer 34D, the exp_tasks pointer 34E and the boost_tasks pointer 34F to point to the next blocked task on the blocked-tasks list. If there are no further blocked tasks, the pointer(s) will be set to NULL. Block 238 also initializes the rcu_node_entry field 36C in the reader's task structure 36 to reflect the fact that the reader has been removed from the blocked-tasks list.

Figure 23B:
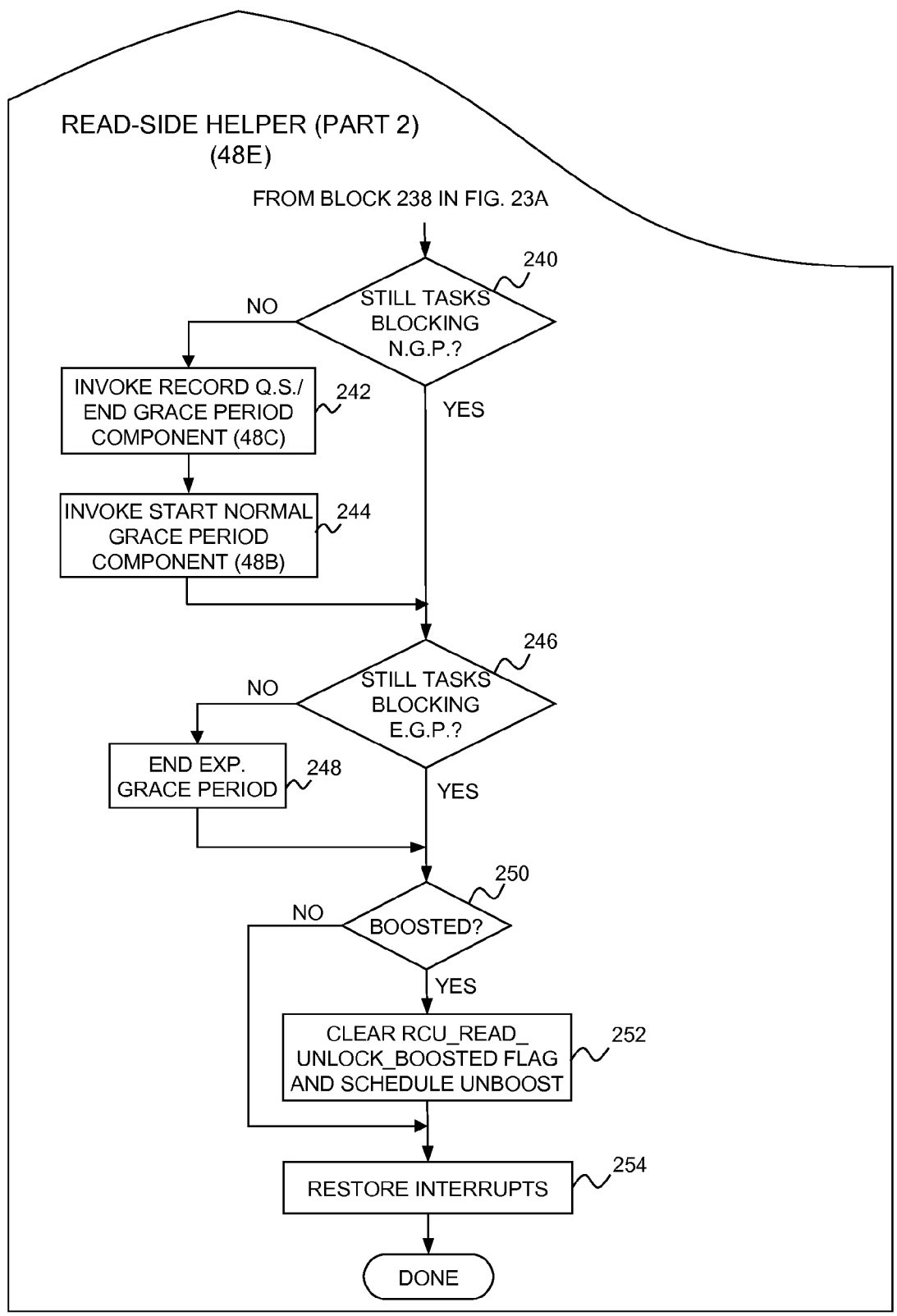
FIG. 23B is a second part of a flow diagram illustrating operations that may be performed by a read-side helper of the RCU subsystem.

With further reference now to FIG. 23B, block 240 uses the information recorded in block 226 to determine if the current asynchronous (normal) grace period was previously blocked by a reader 21, but is no longer blocked. If this is the case, block 242 invokes the record quiescent state/end grace period component 48C to record a quiescent state for the processor 4. Block 244 then invokes the start normal grace period component 48B to start a new grace period. Block 246 uses the information recorded in block 226 to determine if a current expedited grace period was previously blocked by a reader 21 but is no longer blocked. If this is the case, block 248 ends the expedited grace period. Processing advances to block 250 following block 248 or if block 246 determines there are still tasks blocking the current expedited grace period. Block 250 checks the rcu_read_unlock_special field 36B in the reader's task structure 36 to determine if the RCU_READ_UNLOCK_BOOSTED flag is set. If it is, block 252 clears this flag and invokes a reader unboost component (not shown) to unboost the reader 21. Following block 252, or if the "No" path was taken from block 250, block 254 restores interrupts and the read-side helper 48E returns.

Having now described the operations of the various RCU subsystem support functions 40, the discussion returns to the RCU preempt control block 34 that was first mentioned in connection with FIG. 8. As previously stated, the RCU preempt control block 34 is intended for use in a uniprocessor implementation of preemptible RCU, such as the uniprocessor system 2 of FIG. 4. Multiprocessor implementations, such as the multiprocessor system 2A of FIG. 5, require consideration of how multiple processors can access and manipulate the various RCU preempt control block fields in a manner that is synchronized and preferably scalable. A proposed solution is to adopt the hierarchical RCU model used in current versions of the Linux® kernel, and which has been previously publicized by applicant (See P. McKenney, "Hierarchical

Figure 24:
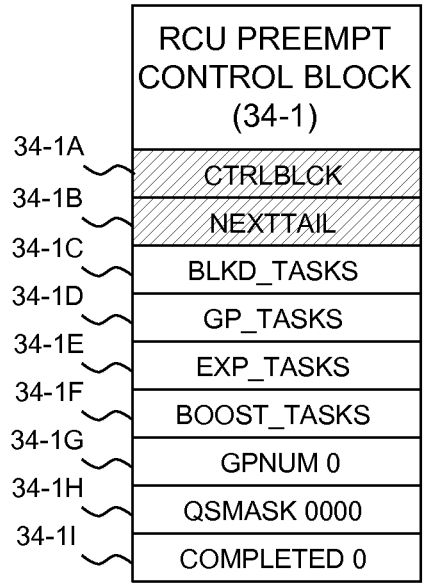
FIG. 24 is a block diagram showing a modified multiprocessor RCU preempt control block.

RCU", Nov. 4, 2008). In hierarchical RCU, a hierarchy of rcu_node structures, beginning from a root rcu_node structure and extending to plural leaf rcu_node structures, is used to track processor quiescent states and other information. This information includes the four-task list array [ ] described in the "Background" section above for tracking readers that do/don't block a current asynchronous grace period and do/don't block an expedited grace period. The present grace period detection technique could be implemented in a multiprocessor system running hierarchical RCU by modifying the rcu_node structures. In particular, the leaf rcu_node structures and the root rcu_node structure could be modified to remove the existing four-task list array [ ] and incorporate a modified RCU preempt control block 34-1, as shown in FIG. 24. The reason the root rcu_node structure may include the RCU preempt control block 34-1 is to handle tasklist migration in case all processors for a given rcu_node structure have gone offline. In that case, the blocked-tasks list of the rcu_node structure could be moved to the root rcu_node structure. It will be seen that the multiprocessor RCU preempt control block 34-1 is similar to its uniprocessor counterpart. Differences include the fact that the control block field 34A and the RCU nexttail pointer 34B may be removed (as shown by the use of cross-hatch shading). With respect to the control block field 34A, hierarchical RCU uses a per-processor data structure called "rcu_data" to maintain per-processor callback lists. The rcu_data structure for each processor includes a pointer that references the processor's designated leaf rcu_node structure. Thus, instead of the RCU preempt control block 34-1 maintaining a pointer to an rcu data structure, the rcu_data structure would maintain a pointer to the rcu_node containing the RCU preempt control block 34-1. With respect to the nexttail pointer 34B, the rcu_data structure in hierarchical RCU maintains the processor's callback list head pointer and an array [ ] of tail pointers denoting various callback list portions. Thus, a separate nexttail pointer is not needed in the RCU preempt control block 34-1. A further difference is that the gpcpu field 34H is replaced by a qsmask field 34-1H. This field is already present in existing rcu_node structures. It is a bitmask that contains one bit for each processor and is use to indicate processor quiescent states. Whereas the gpcpu field 34H indicates whether a single processor has reached a quiescent state, the qsmask field 34-1H indicates whether each of the assigned processors has reached a quiescent state. In an example embodiment, the RCU preempt control block 34-1 may be synchronized by the same lock that is already used to protect each rcu_node structure (i.e., rcu_node->lock), as well as by disabling interrupts.

Figure 25A:
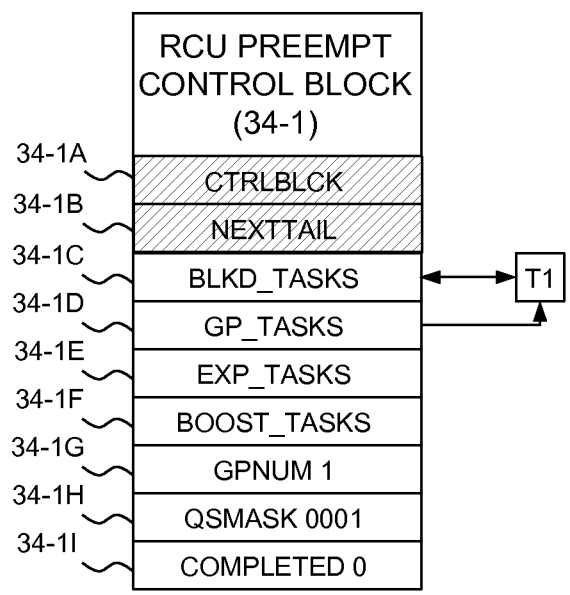
FIGS. 25A-25D are block diagrams showing the modified multiprocessor RCU preempt control block of FIG. 24 and information that may be tracked thereby.

An additional multiprocessor complication arises because the processors (e.g., processors $4_2 \ldots 4_n$ of FIG. 5) that correspond to a given rcu_node structure might become aware of a new grace period at different times. It is therefore possible that a reader 21 whose RCU read-side critical section began after the current asynchronous grace period might be enqueued onto the blocked-tasks list before some other reader whose RCU read-side critical section began before the current RCU grace period. This requires that modifications be made to the blocked reader handler 48A described above in connection with FIG. 15. For example, consider the situation shown in FIG. 25A. Here, task T1 has been queued by processor 0 on the blocked-tasks list. The act of queuing task T1 caused processor 0 to respond to the current grace period, as indicated by the low-order "1" bit in the qsmask field 34-1H, and to set the gp_tasks pointer 34-1D to reference task T1 because it is blocking the current grace period.

Figure 25B:
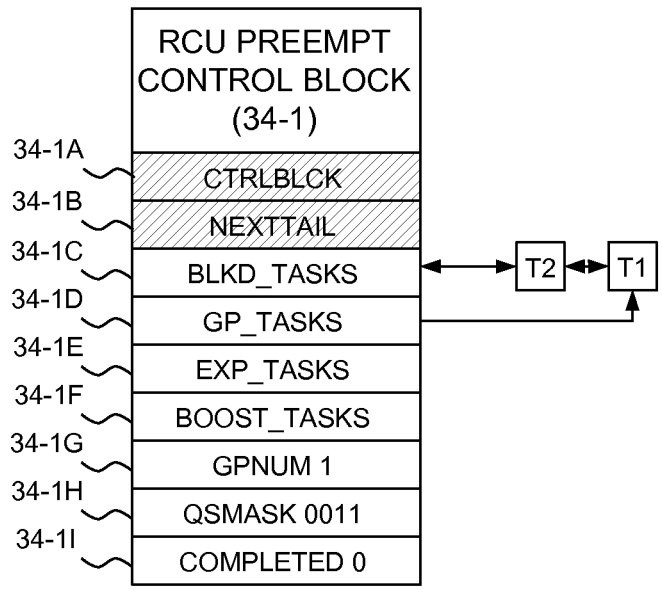
Figure 25C:
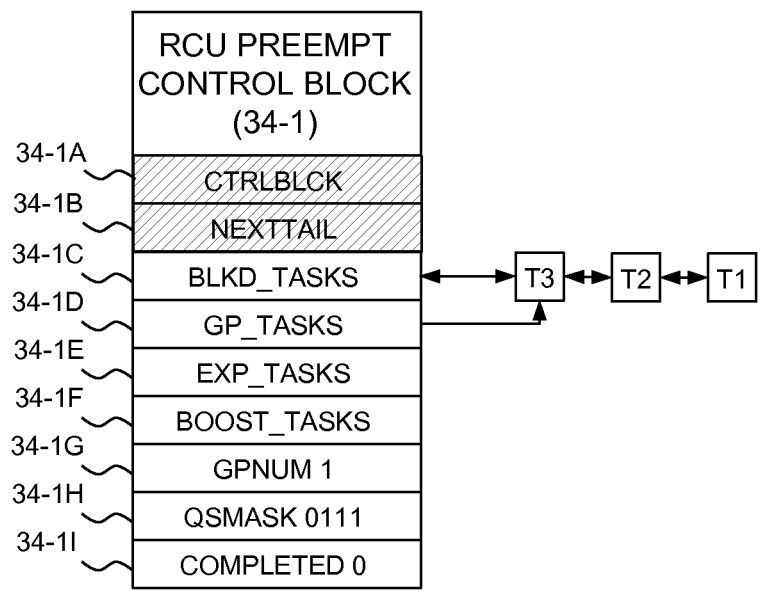
Figure 25D:
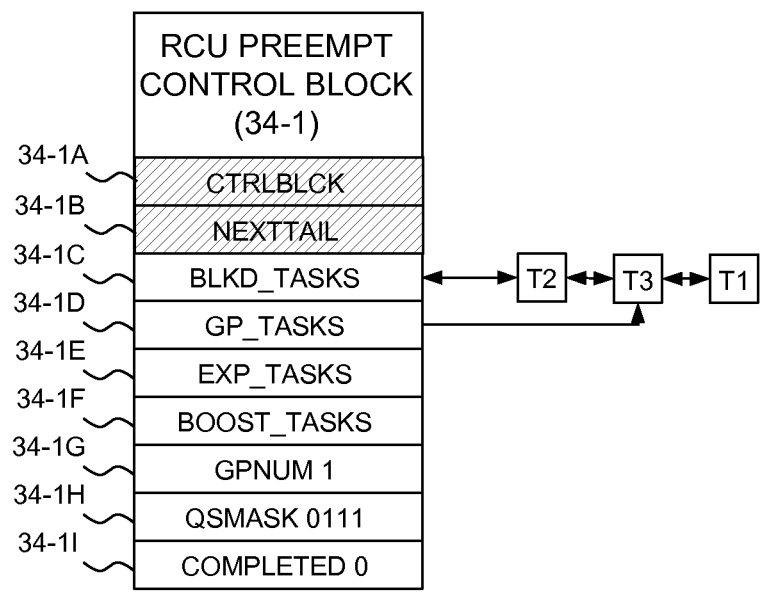

Now suppose that processor 1, which uses the same rcu_node structure as does processor 0, responds to the current grace period and later runs a task T2 that blocks within an RCU read-side critical section. Because processor 1 already responded to the current grace period, T2 is queued at the head of the blocked-tasks list, as shown in FIG. 25B. It will be seen that the the ->qsmask field 34-1H now has its two least-significant bits set, one for processor 0 and the other for processor 1. As is appropriate, the gp_tasks pointer 34-1D has not been changed so that it continues to reference task T1. Suppose further that processor 3, which has not yet responded to the current grace period, has a task T3 that blocks within its RCU read-side critical section. As shown in FIG. 25C, processor 3 would place task T3 at the head of the blocked-tasks list, set its bit in the qsmask field 34-1H, and set the gp_tasks pointer 34-1D to reference task T3. However, this would incorrectly indicate that task T2 is blocking the current grace period. The correct operation would have been to insert insert task T3 before task T1 and point ->gp_tasks at T3, resulting in the situation shown in FIG. 25D.

Figure 15:
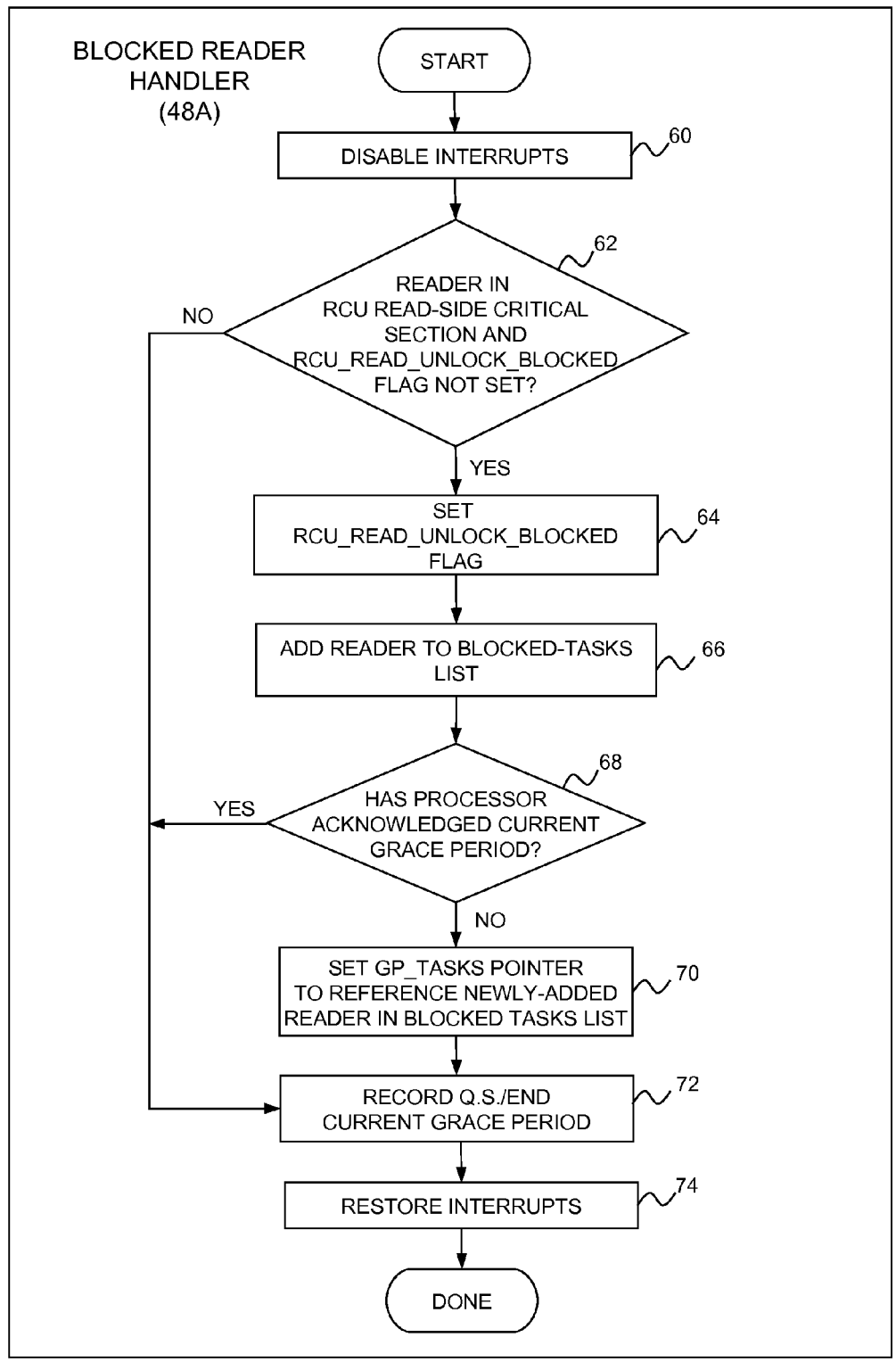
FIG. 15 is a flow diagram illustrating operations that may be performed by a blocked reader handler of the RCU subsystem.
Figure 26A:
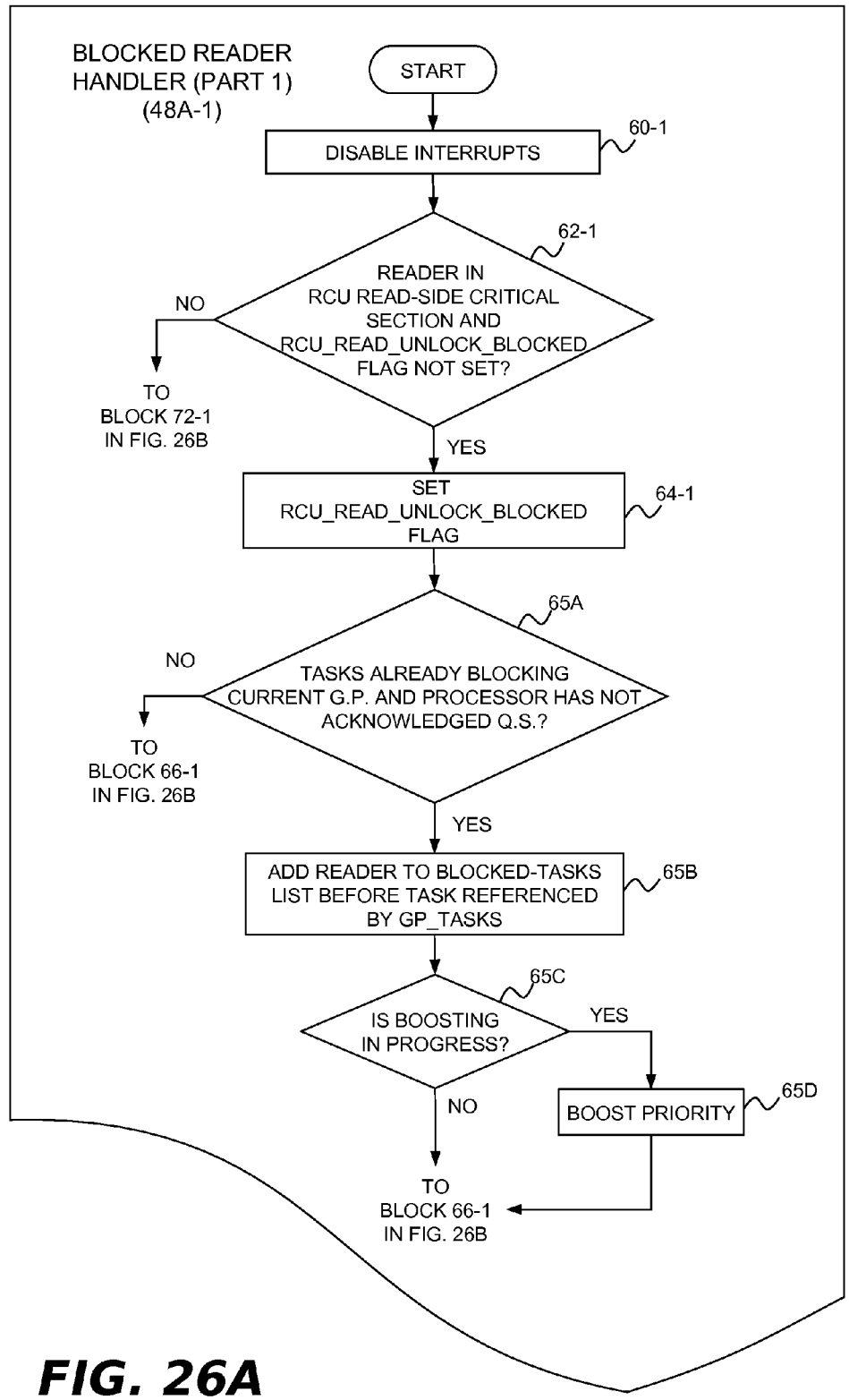
FIGS. 26A is a first part of a flow diagram illustrating operations that may be performed by a multiprocessor blocked reader handler of the RCU subsystem.
Figure 26B:
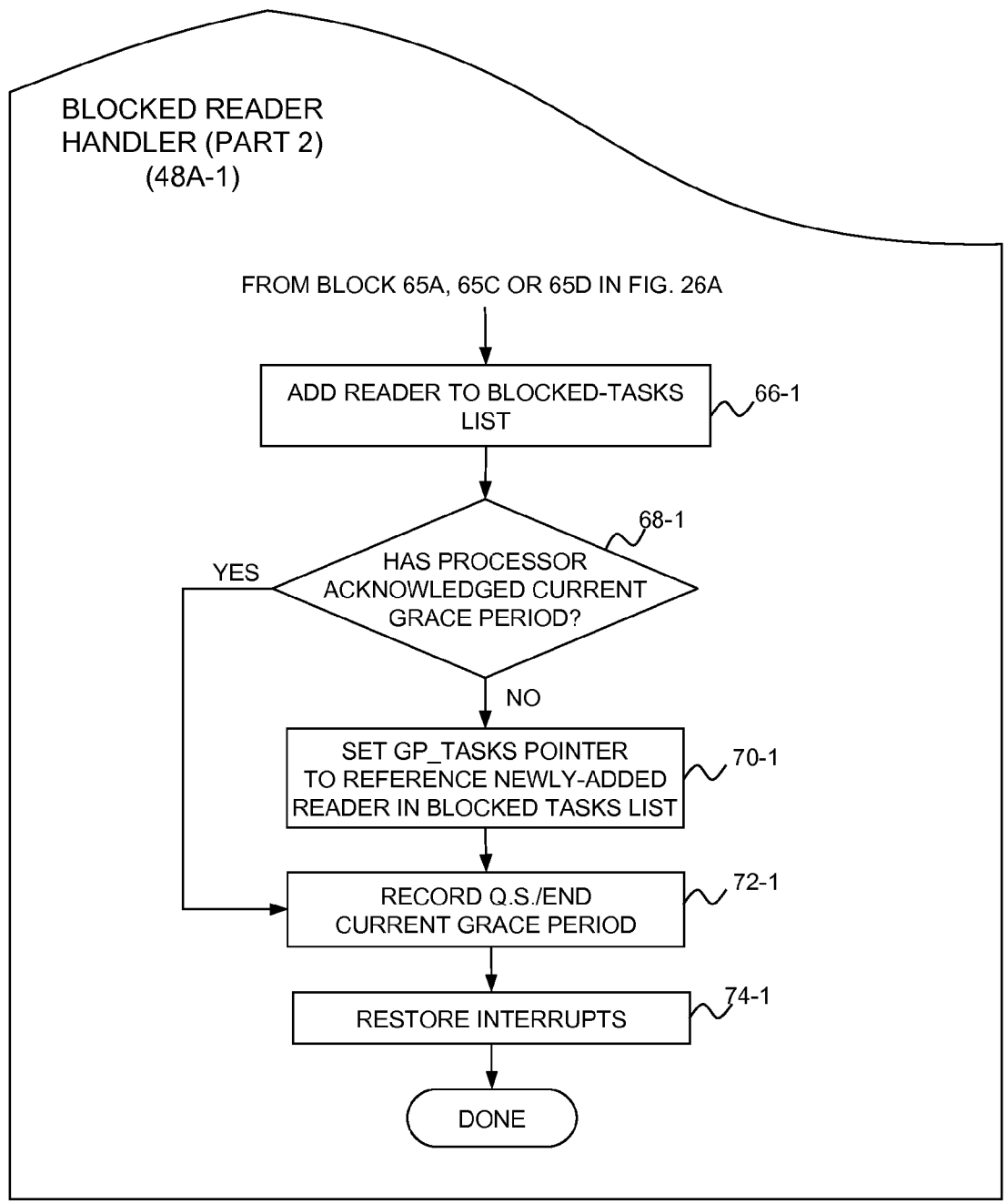
FIG. 26B is a second part of a flow diagram illustrating operations that may be performed by a multiprocessor blocked reader handler of the RCU subsystem.

To accomplish this, a modified blocked reader handler 48A-1 as shown in FIGS. 26A-26B may be used for multiprocessor implementations in lieu of the original blocked reader handler 48A, which is for uniprocessor implementations. The multiprocessor blocked reader handler 48A-1 is similar in many respects to the uniprocessor blocked reader handler 48A, but includes additional logic for determining where to place a newly-preempted reader on the blocked-tasks list to avoid the misplacement scenario shown in FIG. 25C. In FIG. 26A-26B, operations of the multiprocessor blocked reader handler 48A-1 that are the same as those of the uniprocessor blocked reader handler 48A shown in FIG. 15 are indicated by the use of corresponding reference numbers appended with a "-1" modifier. Newly added operations are represented by blocks 65A-65E.

Turning now to FIG. 26A, the multiprocessor blocked reader handler 48A implements block 60-1 to disable interrupts and then block 62-1 to check the condition of the outgoing reader 21. In particular, the reader's task structure 36 is checked and a determination is made whether the rcu_read_lock_nesting field 36A is incremented (e.g., greater than zero), indicating that the reader is about to be blocked inside an RCU critical section, and whether the RCU_READ_UNLOCK_BLOCKED flag in the rcu_read_unlock_special field 36B has not yet been set. If the rcu_read_lock_nesting field 36A is not incremented, or if the READ_UNLOCK_BLOCKED flag is already set, the blocked reader handler 28A proceeds to block 72-1 and invokes the record quiescent state/end grace period component 48C to record a quiescent state. On the other hand, if the conditions of block 62-1 are met, block 64-1 sets the reader's READ_UNLOCK_BLOCKED flag to arrange for the read-side helper 48E to take action when the reader 21 ultimately completes its RCU read-side critical section. Block 65A starts the new set of operations of the multiprocessor blocked reader handler 48A-1 that are not present in the uniprocessor blocked reader handler 48A. It checks the gp_tasks pointer 34-1D to see if there are already readers 21 blocking the current grace period, and also compares the gpnum field 34-1G to the qsmask field 34-1H to see if the current processor 4 has not yet acknowledged a quiescent state. If both conditions are present, block 65B inserts the current reader 21 on the blocked-tasks list immediately before the task referenced by the gp_tasks pointer 34-1D. Block 65C checks the boost_tasks pointer 34-1F to determine if boosting is in progress. If so, block 65D invokes priority boosting on behalf of the newly blocked reader 21 (using any suitable technique). This is the last of the new set of operations provided by the multiprocessor blocked reader handler 48A-1.

Turning now to FIG. 26B, processing now proceeds to block 66-1, which is reached by either the "No" path from block 65A, by the "No" path from block 65C, or from block 65D. Block 66-1 adds the reader 21 to the beginning of the blocked-tasks list. In block 68-1, the RCU preempt control block 34 is checked and a determination is made whether the qsmask field 34-1H equals the gpnum field 34-1G, indicating that the processor 4 has acknowledged the current grace period (and is therefore in a quiescent state). If it has, processing proceeds to block 72-1 and the record quiescent state/end grace period component 48C is invoked in order to end the current grace period. If the processor 4 has not yet acknowledged the current grace period, block 70-1 is implemented and the gp_tasks pointer 34-1D in the RCU preempt control block 34-1 is set to reference the newly-added reader 21 on the blocked-tasks list. Processing then proceeds from block 70-1 to block 72-1 so that the record quiescent state/end grace period component 48C can be invoked to record a quiescent state and end the current grace period. Finally, block 74-1 restores interrupts.

Note that the multiprocessor implementation described above violates the uniprocessor implementation's strict reverse time ordering of the blocked-tasks list. This is acceptable for normal (asynchronous) grace periods because the blocked-tasks list is strictly segregated into tasks that do not block the current grace period at the head of the list and the tasks that are blocking the current grace period at the tail. Any temporal misordering is likely to be limited and will occur only in the head portion of the blocked-tasks list, in the vicinity of the task referenced by the gp_tasks pointer 34-1D. Strict reverse time order will be maintained with respect to all tasks extending from the gp_tasks pointer reference to the tail of the blocked-tasks list. The departure from strict reverse time ordering is likewise acceptable for expedited grace periods because all processors are forced into the operating system scheduler at the beginning of an expedited grace period. Thus, later readers cannot be blocking the expedited grace period even if they do block the current asynchronous grace period (which might happen if an expedited grace period executes concurrently with initialization for a new asynchronous grace period). The departure from strict reverse time ordering of the blocked-tasks list is also acceptable from the standpoint of boosting due to the fact that only those readers blocking the current grace period need boosting, and these are all maintained at the tail of the blocked-tasks list in strict reverse time order beginning with the task referenced by the gp_tasks pointer 34-1D. Any readers that block after boosting begins will be boosted immediately upon blocking due to the operation of blocks 65C and 65D of FIG. 26A. Therefore, the limited temporal misordering that occurs at the head of the block tasks list is acceptable for the multiprocessor case.

Accordingly, a technique for has been disclosed for effectively managing blocked tasks in preemptible RCU. It will be appreciated that the foregoing concepts may be variously embodied in any of a data processing system, a machine implemented method, and a computer program product in which programming logic is provided by one or more machine-useable storage media for use in controlling a data processing system to perform the required functions. Example embodiments of a data processing system and machine implemented method were previously described in connection with FIGS. 4-26B. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 27:
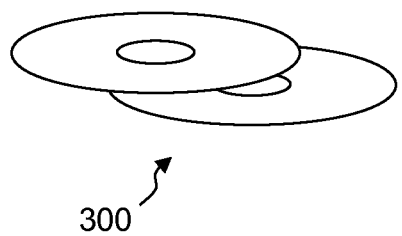
FIG. 27 is a diagrammatic illustration showing example media that may be used to provide a computer program product in accordance with the present disclosure.

Example data storage media for storing such program instructions are shown by reference numerals 8 (memory) and 10 (cache) of the uniprocessor system 2 of FIG. 4 and the multiprocessor system 2A of FIG. 5. The systems 2 and 2A may further include one or more secondary (or tertiary) storage devices (not shown) that could store the program instructions between system reboots. A further example of media that may be used to store the program instructions is shown by reference numeral 300 in FIG. 27. The media 300 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such media can store the program instructions either alone or in conjunction with an operating system or other software product that incorporates the required functionality. The data storage media could also be provided by portable magnetic storage media (such as floppy disks, flash memory sticks, etc.), or magnetic storage media combined with drive systems (e.g. disk drives). As is the case with the memory 8 and the cache 10 of FIGS. 4 and 5, the storage media may be incorporated in data processing platforms that have integrated random access memory (RAM), read-only memory (ROM) or other semiconductor or solid state memory. More broadly, the storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. In a computing system having one or more processors operatively coupled to one or more memory devices, a method for managing all read-copy update reader tasks that have been preempted while executing in a read-copy update read-side critical section on some or all of said one or more processors, said method comprising managing a single blocked-tasks list associated with said some or all of said one or more processors to track said preempted read-copy update reader tasks that are blocking an asynchronous grace period, preempted read-copy update reader tasks that are blocking an expedited grace period, and preempted read-copy update reader tasks that require priority boosting, wherein an expedited grace period forces or simulates a context switch on some or all of said one or more processors to preempt all read-copy update reader tasks.

2. A method in accordance with claim 1, wherein:
a first pointer is used to segregate said blocked-tasks list into preempted read-copy update reader tasks that are and are not blocking a current asynchronous grace period;
a second pointer is used to segregate said blocked-tasks list into preempted read-copy update reader tasks that are and are not blocking an expedited grace period; and
a third pointer is used to segregate said blocked-tasks list into preempted read-copy update reader tasks that do and do not require priority boosting.

3. A method in accordance with claim 2, wherein said blocked-tasks list is ordered such that:
said first pointer references a first preempted read-copy update reader task on said blocked-tasks list that is a newest preempted reader task blocking a current asynchronous grace period, and all preempted read-copy update reader tasks that follow said first preempted read-copy update reader task on said blocked-tasks list are also blocking said current asynchronous grace period;
said second pointer references a second preempted read-copy update reader task on said blocked-tasks list that is a newest preempted read-copy update reader task blocking an expedited grace period, and all preempted read-copy update reader tasks that follow said second preempted read-copy update reader task on said blocked-tasks list are also blocking said expedited grace period; and
said third pointer references a third preempted read-copy update reader task on said blocked-tasks list that is a newest preempted read-copy update reader task that requires priority boosting, and all preempted read-copy update reader tasks that follow said third preempted reader task on said blocked-tasks list also require priority boosting.

4. A method in accordance with claim 3, wherein said first preempted read-copy update reader task, said second preempted read-copy update reader task and said third preempted read-copy update reader task are the same preempted read-copy update reader task.

5. A method in accordance with claim 4, wherein said blocked-tasks list is further ordered such that all preempted read-copy update reader tasks that are ahead of said first preempted read-copy update reader task are blocking a subsequent asynchronous grace period that follows said current asynchronous grace period.

6. A method in accordance with claim 5, wherein said system is either (1) a uniprocessor system in which said blocked-tasks list maintains all of said preempted read-copy update reader tasks in strict reverse time order, or (2) a multiprocessor system in which said blocked-tasks list maintains all of said preempted read-copy update reader tasks starting from said first preempted read-copy update reader task in strict reverse time order.

7. A method in accordance with claim 6, further including one or more data structures that each maintain an instance of said blocked-tasks list, said first pointer, said second pointer and said third pointer on behalf of at least one of said one or more processors, and wherein each of said data structures further maintains a grace period number, a quiescent state indicator and a grace period completed indicator on behalf of said at least one processor.

8. In a computing system having one or more processors operatively coupled to one or more memory devices, a method for managing read-copy update readers that have been preempted while executing in a read-copy update read-side critical section, comprising:
providing an in-memory data structure whose fields include a first data structure field storing a blocked-tasks list header, second, third and fourth data structure fields storing blocked-task list pointers, a fifth data structure field storing a grace period number, a sixth data structure field storing a quiescent state indicator for one or more processors and a seventh data structure field storing a grace period completion number:
using said first data structure field to build a single blocked-tasks list that tracks preempted reader tasks that are blocking an asynchronous grace period, preempted reader tasks that are blocking an expedited grace period, and preempted reader tasks that require priority boosting;
using said second data structure field to store a first pointer that segregates said blocked-tasks list into preempted reader tasks that are and are not blocking a current asynchronous grace period;
using said third data structure field to store a second pointer that segregates said blocked-tasks list into preempted reader tasks that are and are not blocking an expedited grace period;
using said fourth data structure field to store a third pointer that segregates said blocked-tasks list into preempted reader tasks that do and do not require priority boosting;
using said fifth data structure field to increment said grace period number and start a new grace period;
using said sixth data structure field to increment said quiescent state indicator and indicate that a processor quiescent state has been reached that initiates blocked reader task monitoring and an end of said new grace period once all preempted reader tasks on a tail portion of said blocked-tasks list that begins with said first preempted reader have completed read-copy update read-side critical section processing; and
using said seventh data structure field to increment said grace period completion number and declare said end of said new grace period.

9. A method in accordance with claim 8, wherein:
a blocked reader handler adds a preempted reader task to said blocked-tasks list and manipulates said first pointer to reference said preempted reader task if a processor quiescent state is not indicated by said quiescent state indicator;
an expedited grace period component manipulates said second pointer to reference a newest preempted reader task on said blocked-tasks list that is blocking an expedited grace period;
a boost reader component manipulates said third pointer to reference a newest preempted reader task on said blocked-tasks list that requires boosting; and
a read-side helper removes a preempted reader task from said blocked-tasks list and manipulates said first pointer, said second pointer and said third pointer to an extent that said pointers reference said preempted reader task being removed.

10. A method in accordance with claim 9, wherein:
a start normal grace period component increments said grace period number and manipulates said first pointer to reference a newest reader on said blocked-tasks list at a start of said new grace period; and
a record quiescent state/end grace period component increments said quiescent state indicator to record said processor quiescent state during said new grace period and increments said grace period completion number to end said new grace period.

11. A method in accordance with claim 10, wherein said record quiescent state/end grace period component periodically monitors said blocked-tasks list and, if there are no preempted reader tasks referenced by said first pointer, increments said grace period completion number to end said new grace period, and invokes callback processing if there are callbacks that requiring processing.

* * * * *